United States Patent
Honda et al.

(10) Patent No.: US 10,195,654 B2
(45) Date of Patent: Feb. 5, 2019

(54) SHOWERHEAD AND SHOWERHEAD MANUFACTURING METHOD

(71) Applicant: TOTO LTD., Fukuoka (JP)

(72) Inventors: Hideyasu Honda, Kitakyushu (JP);
Nobuyasu Reisen, Kitakyushu (JP);
Shinji Nakagawa, Kitakyushu (JP);
Kohei Sato, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 163 days.

(21) Appl. No.: 15/429,967

(22) Filed: Feb. 10, 2017

(65) Prior Publication Data
US 2017/0151601 A1 Jun. 1, 2017

Related U.S. Application Data

(60) Division of application No. 13/739,966, filed on Jan. 11, 2013, now abandoned, which is a continuation of
(Continued)

(30) Foreign Application Priority Data

Jul. 15, 2010 (JP) ................. 2010-160634

(51) Int. Cl.
*B05B 1/18* (2006.01)
*B21D 26/033* (2011.01)
(Continued)

(52) U.S. Cl.
CPC .............. *B21D 26/033* (2013.01); *B05B 1/18* (2013.01); *B05B 1/185* (2013.01); *B23K 26/21* (2015.10);
(Continued)

(58) Field of Classification Search
CPC .. B05B 1/00; B05B 1/005; B05B 1/02; B05B 1/10; B05B 1/14; B05B 1/205;
(Continued)

(56) References Cited

U.S. PATENT DOCUMENTS

| | | | |
|---|---|---|---|
| 1,665,744 A | 4/1928 | Landberg |
| 1,906,991 A | 5/1933 | McTernan |

(Continued)

FOREIGN PATENT DOCUMENTS

| | | |
|---|---|---|
| JP | 09-502650 A | 3/1997 |
| JP | 09-280403 A | 10/1997 |
| JP | 2001-288793 A | 10/2001 |
| JP | 2002-320565 A | 11/2002 |

(Continued)

OTHER PUBLICATIONS

International Search Report; JP2011/066123; dated Aug. 30, 2011.
Written Opinion of the International Searching Authority; JP2011/066123; dated Aug. 30, 2011.

*Primary Examiner* — Jun Yoo
(74) *Attorney, Agent, or Firm* — Studebaker & Brackett PC

(57) ABSTRACT

The present invention has the object of providing a metal showerhead lighter than previous, at a low cost. A showerhead 3 furnished with an outer cylinder 31 in which a metal plate is plastically deformed and formed into a cylindrical shape in which the base end portion thereof is left open; and a water conduit member 32 which is inserted from the open end of the base end portion side into the outer cylinder to supply hot or cold water supplied from a hose into outer cylinder 31; whereby a gripping portion 311 for holding outer cylinder 31 by hand is provided on the base end portion of outer cylinder 31, and a spray portion 33 is provided in which multiple spray holes 33b are formed to spray hot or cold water supplied by water conduit member 32 to the front end portion side of outer cylinder 31.

2 Claims, 19 Drawing Sheets

Related U.S. Application Data application No. PCT/JP2011/066123, filed on Jul. 14, 2011.

(51) Int. Cl.
*B23K 26/21* (2014.01)
*B05B 15/62* (2018.01)
*B05B 15/65* (2018.01)

(52) U.S. Cl.
CPC ............... *B05B 15/62* (2018.02); *B05B 15/65* (2018.02); *Y10T 29/49826* (2015.01)

(58) Field of Classification Search
CPC ........... B05B 1/207; B05B 1/04; B05B 1/185; B05B 1/18; B05B 15/65; B05B 15/62; B21D 26/033; B23K 26/21; Y10T 29/49826; E03C 1/0405; E03C 1/0412
See application file for complete search history.

(56) References Cited

U.S. PATENT DOCUMENTS

| | | |
|---|---|---|
| 4,600,153 A | 7/1986 | Stone |
| 5,685,489 A | 11/1997 | Larsen |
| 6,145,757 A | 11/2000 | Knapp |
| 6,775,865 B1 * | 8/2004 | Lin .......................... B05B 1/18 4/615 |
| 7,415,991 B2 | 8/2008 | Meehan et al. |
| 8,376,248 B2 | 2/2013 | Meisner et al. |
| 8,430,345 B2 | 4/2013 | Esche et al. |

FOREIGN PATENT DOCUMENTS

| | | |
|---|---|---|
| JP | 2003-181335 A | 7/2003 |
| JP | 2007-130615 A | 5/2007 |
| JP | 2007-312829 A | 12/2007 |
| JP | 2008-012413 A | 1/2008 |
| WO | 1995/007760 A1 | 3/1995 |

* cited by examiner (a)

(b)

SHOWERHEAD AND SHOWERHEAD MANUFACTURING METHOD

TECHNICAL FIELD

The present invention relates to a showerhead capable of hand held use in a bath or shower room, and to a method for manufacturing same.

BACKGROUND ART

Proposals have been advanced for shower devices in which showerhead constituent elements are formed of metal (Patent Document 1). Showerheads with metal constituent elements are fabricated by assembling constituent elements such a mouthpieces and support bodies manufactured by casting, with ornamental plating such as nickel-chrome plating or the like applied as needed. Since constituent elements are cast, showerheads manufactured by metal casting have thick walls. This means that large amounts of raw materials are required, making material cost very high. In addition, because such showerheads are heavy, a high environmental load is imposed due to the large quantities of $CO_2$ exhausted during transport.

PRIOR ART REFERENCES

Patent References

Patent Document 1: Unexamined Patent Application H9-502650.

SUMMARY OF THE INVENTION

Problems the Invention Seeks to Resolve

The present invention therefore has the object of providing a metal showerhead lighter than previous, at a low cost.

Means for Resolving the Problem

Furthermore, in order to resolve the above-described problems the invention of Claim 1 is a method for manufacturing a showerhead, having: a shell shape forming step for forming the metal pipe into a predetermined shape by plastic deformation of metal pipe; a spray hole forming step for forming multiple spray holes in the metal pipe formed into a predetermined shape; a placement step for placing a water conduit member through an opening portion in the metal pipe into the metal pipe in which spray holes are formed; and a welding step for closing the opening portion by laser welding a metal member to the opening portion.

The external appearance of the showerhead is thus formed by laser welding of a metal member to an opening portion of a metal pipe, therefore a uniform metal external appearance is achieved, and a showerhead with superior aesthetics and without noticeable seams can be manufactured. Because closing of the opening portion of the metal pipe into which the water conduit member is inserted occurs after placement of the water conduit member inside the metal pipe formed in a predetermined shape, the degree of freedom in designing the manufactured showerhead can be increased.

The invention of Claim 2 is the showerhead manufacturing method of Claim 1, whereby the shell shape forming step has: a step for placing the metal pipe in a mold for forming a bulge; a step for filling in the metal pipe disposed inside the mold with a filler; and a bulge-forming step for expanding the metal pipe by applying pressure to the filler to plastically deform the metal pipe into the shape of the mold.

Since the metal pipe is thus formed by bulge forming, the showerhead, which has numerous curved surfaces, can be easily formed of metal.

Effect of the Invention

The present invention enables the low cost provision of a metal showerhead with thinner walls and a lighter weight than a conventional showerhead. In addition, showerheads with previously unavailable novel designs can be provided.

EMBODIMENTS OF THE INVENTION

Figure 1:
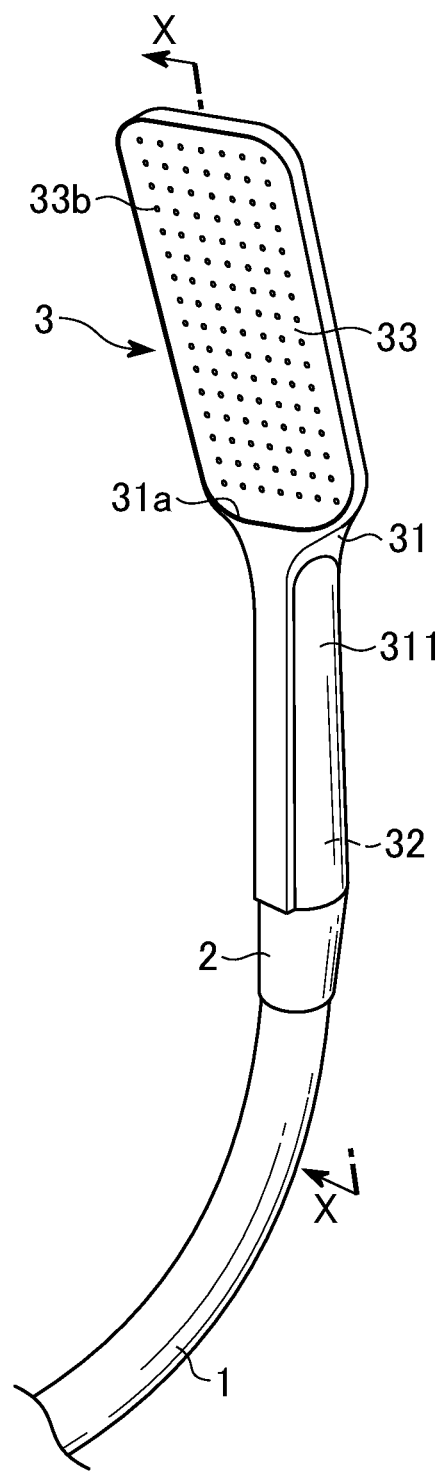
FIG. 1: A perspective drawing showing a showerhead according to a first embodiment of the present invention.

Below, referring to the attached drawings, we discuss embodiments of the showerhead of the present invention.

Note that when the same constituent elements are found in differing embodiments, they are assigned the same reference numerals and an explanation thereof is omitted.

FIG. 1 is a perspective drawing showing a showerhead according to a first embodiment of the present invention.

The shower apparatus is constituted so that showerhead 3 is connected via a socket 2 to a shower hose 1 connected to the shower-side spouting port on a mixer faucet (not shown), and showerhead 3 can be used in a hand-held manner.

The shower apparatus comprises: an outer cylinder 31 forming the shell of the showerhead 3; a water conduit member 32 inserted into and engaged with the base end portion of outer cylinder 31 for directing hot or cold water supplied from shower hose 1 into outer cylinder 31; and multiple spray holes 33b engaging the front end portion of outer cylinder 31 and spraying hot or cold water in a shower form.

Outer cylinder 31 is a member formed from a metal such as SUS304. In the present embodiment, a pipe material (electric resistance welded pipe) obtained by roll forming a metal plate material is furthermore plastically deformed by bulge forming or the like to expand the front end portion of the pipe and form an outer cylinder 31. This outer cylinder 31 is made as a gripping portion 311, with a diameter affording easy holding by hand on the base end side; and the front end portion side thereof is given a thin shape (approximately 10-15 mm), flatter and wider than gripping portion 311. Note that it is also possible to use seamless pipe material obtained by extrusion or drawing rather than roll forming.

This allows for the formation of an outer cylinder 31 with a thin wall of approximately 0.5 mm to 1 mm, thus reducing weight compared to conventional showerheads. Materials and manufacturing costs, transport costs, and the like can thus be reduced, so that metal showerheads can be provided at a lower cost than in the past. By reducing the weight of the showerhead, the volume of $CO_2$ generated during transport can also be reduced.

Formation of outer cylinder 31 from a lustrous metal such as SUS304 enables the manufacture of a high quality metal showerhead without ornamental surface plating such as chrome plating or the like as would be the case with brass. There is therefore no risk that plating will peel, as with conventional showerheads on which metallic exterior appearances are achieved by nickel-chrome plating or the like.

Water conduit member 32 is molded of resin; connected at one end thereof is shower hose 1, on which a water intake port 32a is formed for receiving the supply of hot or cold water; formed at the other end is a water discharge port 32b for discharging the supplied hot or cold water. Water conduit member 32 is inserted into outer cylinder 31 from the opposite end to that on which water discharge port 32b is formed, and is affixed to outer cylinder 31.

Spray member 33 (spray portion) 33 is a resin injection molded part, and is attached so as to be embedded in opening portion 31a formed in the thin body part at the front end portion of outer cylinder 31. Spray member 33 is connected to water discharge port 32b of water conduit member 32, and a guide port 33a is formed for guiding hot or cold water into spray member 33; multiple spray holes 33b are also formed for spraying the guided hot or cold water onto a surface exposed on the outside of outer cylinder 31. This spray member 33 is affixed to outer cylinder 31 or to water conduit member 32 after being attached by engagement with opening portion 31a on outer cylinder 31.

In addition, the end surface of outer cylinder 31 is exposed to the outside without being covered by spray member 33. I.e., the thin metal end surface is exposed, and no end portion treatment such as covering over a metallic showerhead end surface with a resin member is performed, as was done on previous showerheads with ornamental plating in order to prevent the peeling off of that plating. Thus a showerhead 3 of a clean design, metal on all sides, can be obtained.

Figure 2:
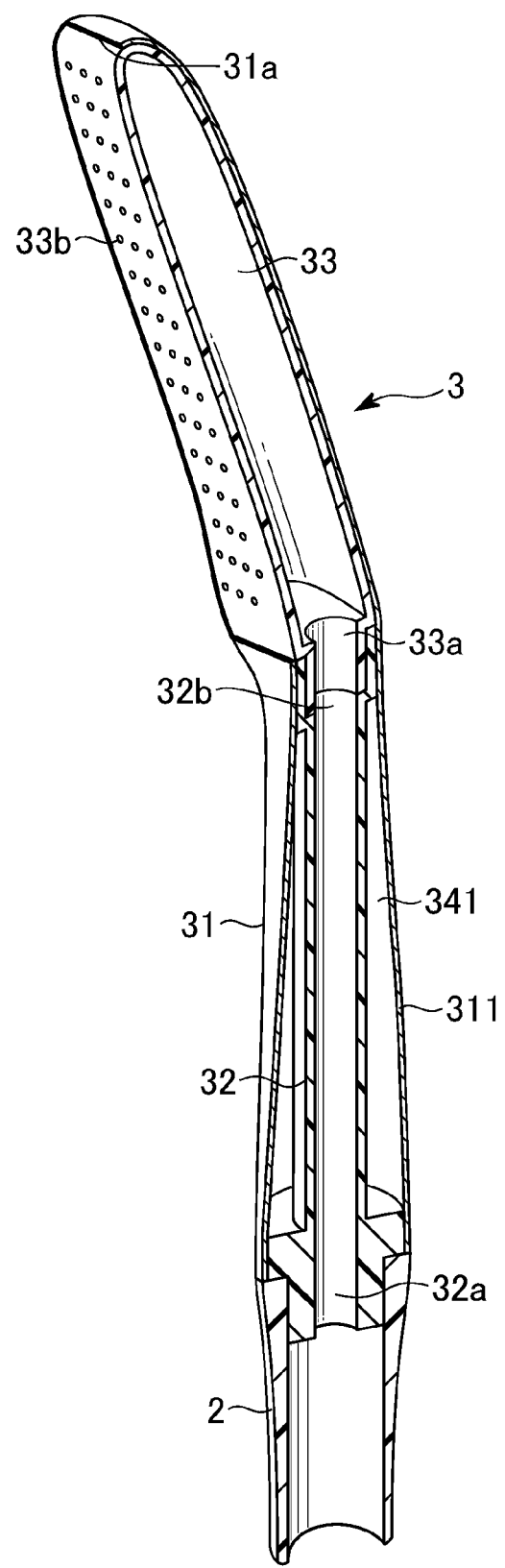
FIG. 2: A section through X-X of the showerhead shown in FIG. 1.

A section through X-X of the shower apparatus is shown in FIG. 2.

Provided inside the showerhead, as described above, is a water conduit member 32, inserted into outer cylinder 31 from the open end of the base end side. This water conduit member 32 is contained within outer cylinder 31 and separated by a gap of a predetermined dimension relative to outer cylinder 31. As described above, outer cylinder 31 is a thin walled metal with a thickness of approximately 0.5 mm to 1 mm, and therefore easily transmits heat, however by providing a gap relative to water conduit member 32, a heat insulating air layer 341 is formed by this gap, so there is little tendency for heat to be transmitted from the hot or cold water flowing in water conduit member 32. While it is true that outer cylinder 31 is heated by body heat when showerhead 3 is hand held, that heat is impeded from transferring to water conduit member 32. It is thus difficult to perceive the temperature of hot or cold water, and there is little tendency for the temperature of the hot or cold water to change due to body heat, when showerhead 3 is hand held.

Figure 3:
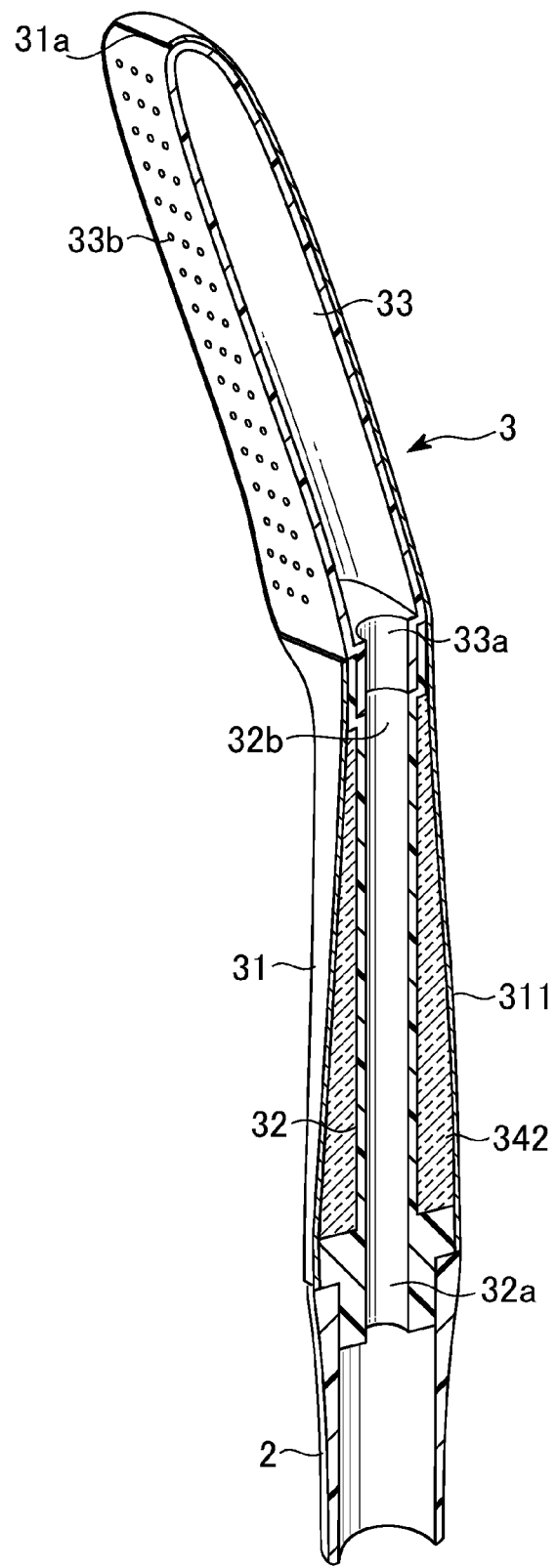
FIG. 3: A section through X-X in a variant example of the showerhead of the first embodiment of the present invention.

FIG. 3 is a sectional diagram through X-X showing a variant example of the present embodiment.

In this variant example, heat insulation 342 with a low thermal conductivity ratio is inserted in the gap between outer cylinder 31 and water conduit member 32 in place of air layer 341 as the insulating means shown in FIG. 2. A material with a low thermal conductivity and high self-adhesion characteristics such as polyurethane foam is desirable as the heat insulation 342.

While not illustrated, as another variant example it is also acceptable to impart thermal insulating characteristics to water conduit member 32 itself by increasing the thickness of water conduit member 32.

In either of these variant examples, the same effect can be obtained as that in the first embodiment.

Next we discuss a second embodiment of the showerhead of the present invention.

Figure 4:
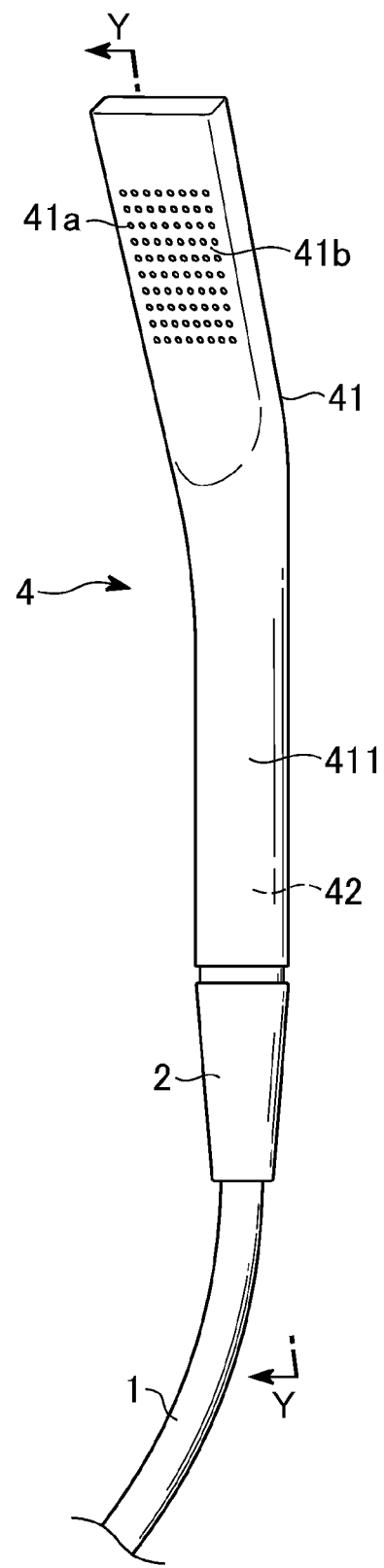
FIG. 4: A perspective drawing showing a showerhead according to a second embodiment of the present invention.

FIG. 4 is a perspective drawing showing a showerhead according to a second embodiment.

The shower apparatus is constituted so that showerhead 4 is connected via a socket 2 to a shower hose 1 connected to the shower-side spouting port on a mixer faucet (not shown), and showerhead 4 can be used in a hand-held manner.

The shower apparatus comprises an outer cylinder 41 forming the shell of a showerhead 4, on the front end portion side of which a spray portion 41b having multiple spray holes 41a is formed; and a water conduit member 42 for conducting hot or cold water supplied from shower hose 1 into outer cylinder 41.

Outer cylinder 41, similar to the first embodiment, is a member formed of a metal such as SUS304, for example. The front end portion of the pipe material (electric resistance welded pipe), obtained by roll forming a metal plate material, is sealed by welding or brazing of pipe material or other metal member to make a closed pipe, then further plastically deformed by bulge forming or the like to expand the front end portion of the pipe and form an outer cylinder. Alternatively, pipe material (electric resistance welded pipe)

obtained by roll forming of metal plate material can be plastically deformed by bulge forming or the like, expanding and deforming the front end portion to form the outer cylinder. This outer cylinder 41 is made as a gripping portion 411, with a diameter affording easy holding by hand on the base end side; and the front end portion side thereof is made into a thin shape spray portion 41b, flatter and wider than gripping portion 411. Note that seamless pipe material obtained by extrusion or drawing rather than roll forming can also be used.

Outer cylinder 41 is thus formed into a thin wall of approximately 0.5 mm to 1 mm, resulting in a lighter showerhead than in the past. This enables a reduction in materials and manufacturing costs, transport costs, and the like so that metal showerheads can be provided at a lower cost than in the past. By reducing the weight of the showerhead, the volume of $CO_2$ generated during transport can also be reduced.

Because the entirety of showerhead 4 except for the part connected to the shower hose 1 is covered with a seamless outer cylinder 41 formed of a lustrous metal such as SUS304, a good quality metal showerhead can be fabricated even without ornamentation using chrome plating or the like as is done with brass, etc. Hence there is no risk that plating will peel, as with conventional showerheads with metallic exterior appearances achieved through nickel-chrome plating or the like. Except for the base end portion, no seam between a resin member and a the main body metal member appears on the surface of showerhead 4 as the result of installing of spray member 33 in opening portion 31a of outer cylinder 31, as was seen in the first embodiment, so there is no caking of dirt on seams, and the showerhead conveys a highly sanitary impression.

As in the first embodiment, water conduit member 42 is molded of resin; connected at one end thereof is shower hose 1, on which a water intake port 42a is formed for receiving the supply of hot or cold water, and at the other end thereof is formed a water discharge port 42b for discharging supplied hot or cold water. Water conduit member 42 is affixed to outer cylinder 41 after being inserted into outer cylinder 41 from the other end portion thereof.

Figure 5:
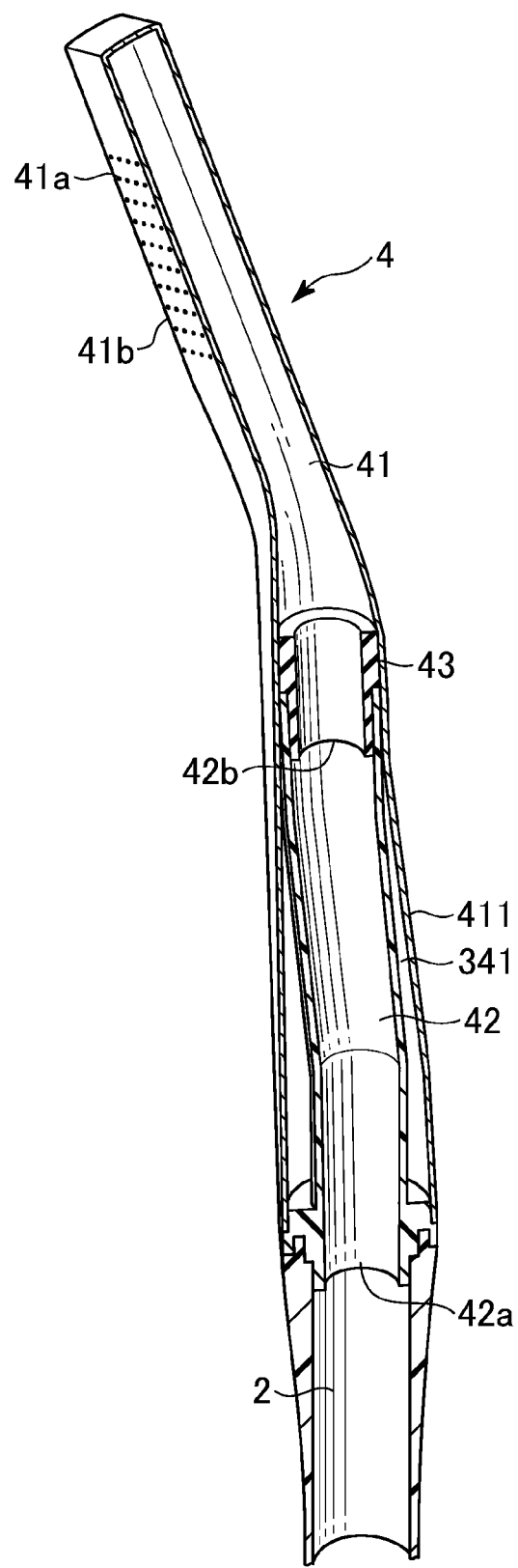
FIG. 5: A section through Y-Y of the showerhead shown in FIG. 4.

A section through Y-Y of the shower apparatus is shown in FIG. 5.

Provided inside the showerhead, as described above, is a water conduit member 42, inserted into outer cylinder 41 from the open end of the base end side. The front end of the water conduit member 42 is pressed into outer cylinder 41 via a packing 43. Therefore hot or cold water spouted from water conduit member 42 discharge port 42b does not penetrate into the gap between outer cylinder 41 and water conduit member 42.

Note that because a heat insulating means (air layer 341) of the same type as the first embodiment is formed between outer cylinder 41 and water conduit member 42, it is both difficult to difficult to perceive the temperature of hot or cold water, and there is little tendency for the temperature of the hot or cold water to change due to body heat, when showerhead 4 is hand held.

In the showerhead of the present invention, hot or cold water discharged from water conduit member 42 discharge port 42b is guided over the inner circumferential surface of outer cylinder 41 to spray holes 41a. I.e., outer cylinder 41 functions as a hot or cold water conduit.

Thus with respect to showerhead 4 outer cylinder 41, the water conduit member 42, being a resin molded part, is disposed on the base end portion side only, therefore the center of gravity of showerhead 4 is positioned at gripping portion 411, so that the sense of stability gained when holding showerhead 4 by hand is increased compared to conventional showerheads.

Next, referring to figures, we explain a concrete example of the spray portion of the showerhead.

Figure 6:
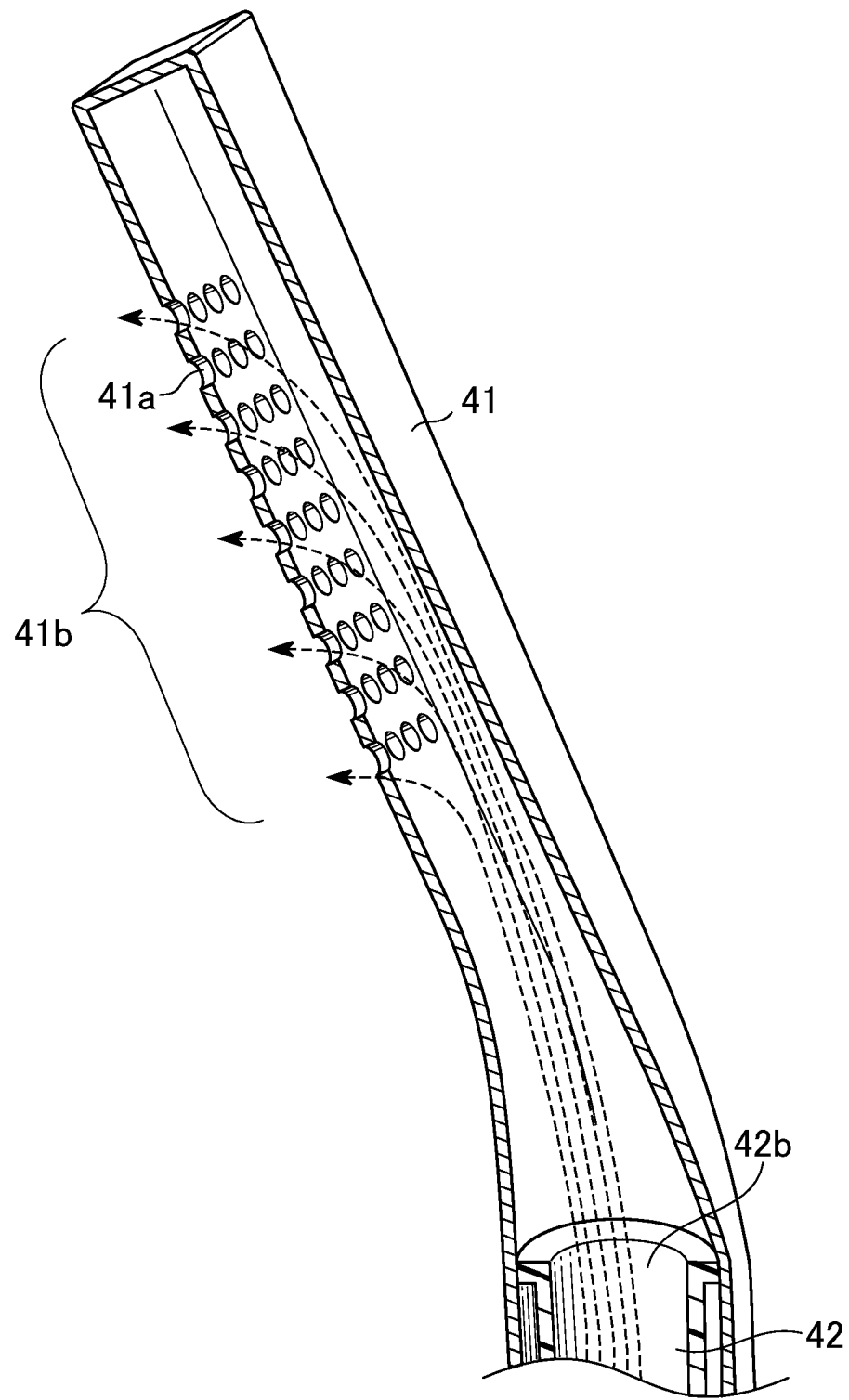
FIG. 6: An expanded section of the spray portion of the showerhead shown in FIG. 4.

FIG. 6 is a partial expanded sectional diagram explaining the structure of the spray portion.

As shown in FIG. 6, hot or cold water discharged from water conduit member 42 is sprayed from spray holes 41a. In the present embodiment, only a portion—i.e., the spray portion 41b—is made thicker on outer cylinder 41, which is formed from thin-walled metal plate of 0.5 to 1 mm thickness. This enables the spray direction to be stabilized.

However, depending on the shape of the front end portion of outer cylinder 41, the flow volume of hot or cold water, etc., it may be difficult to spray water spouted from the multiple spray holes 41a in a shower form (fan shape) when the spray holes are drilled in a thin-walled metal plate of approximately 0.5 mm to 1 mm.

Figure 7:
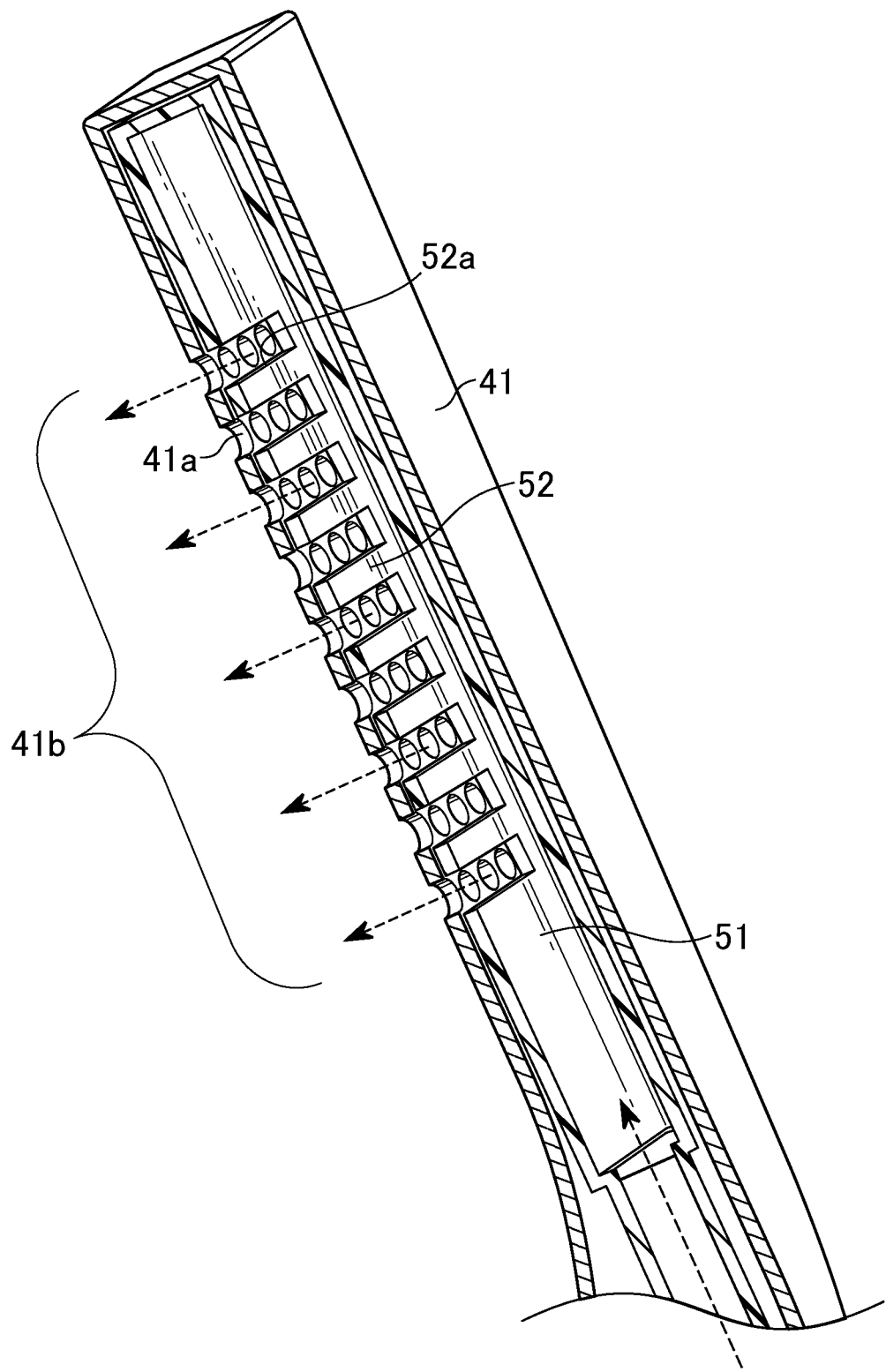
FIG. 7: A partial expanded sectional diagram explaining the spray portion in a variant example of the showerhead of the second embodiment of the present invention.
Figure 8:
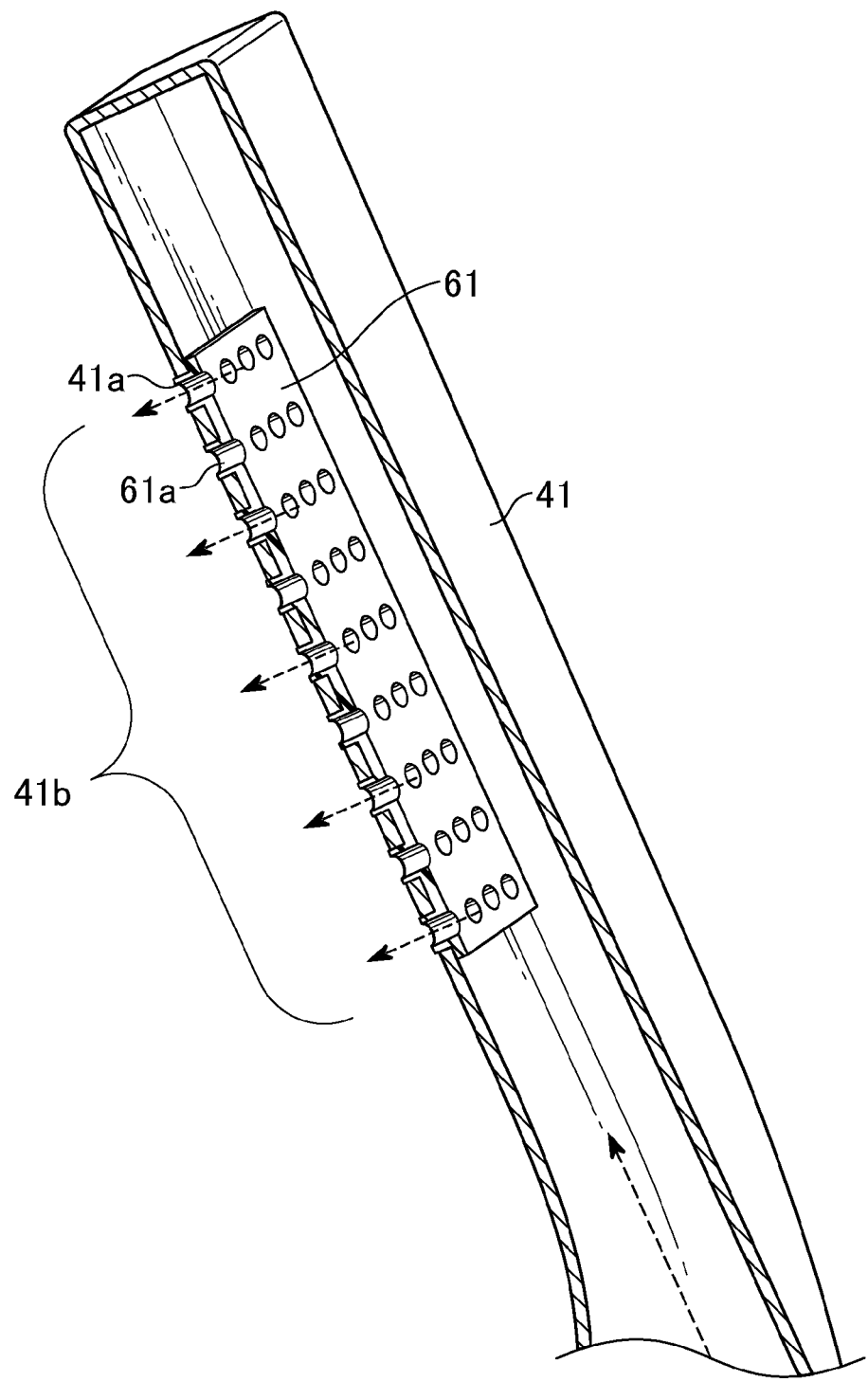
FIG. 8: A partial expanded sectional diagram explaining the spray portion in another variant example of the showerhead of the second embodiment of the present invention.

To respond to this, a member can be provided to define the spray direction, as shown in FIGS. 7 and 8.

FIG. 7 is a partial expanded sectional diagram explaining the spray portion in a variant example of the showerhead of the second embodiment of the present invention.

In this variant example, spray portion 41b is arranged so that a water conduit member 51 is disposed up to the front end portion of outer cylinder 41, and a rectangular opening portion 52a is formed to fit the pitch of spray holes on outer cylinder 41, thus constituting a direction regulating portion 52 for determining the direction in which water flows out from water conduit member 51. This direction regulating portion 52 reduces the force in the advancing direction with which water flows from the base end portion of water conduit member 51 (the end portion on the shower hose side), thus permitting more spraying toward the center axis of spray holes 41a than does the spray portion shown in FIG. 6.

FIG. 8 is a partial expanded sectional diagram explaining the spray portion in another variant example of the showerhead of the second embodiment of the present invention.

In this variant example, spray portion 41b incorporates a spray plate 61 inside outer cylinder 41 spray portion 41b. On this spray plate 61, water passage holes 61a, matching the pitch of the multiple spray holes formed on outer cylinder 41 and having a length greater than the wall thickness of outer cylinder 41, are formed to face in the spray direction, and are attached in a watertight configuration on the inner wall of the side on which outer cylinder 41 spray holes 41a are formed. Hot or cold water discharged from water conduit member 42 discharge port 42b passes through the interior of outer cylinder 41, then passes through water passage holes 61a in spray plate 61 and is sprayed from spray holes 41a.

As noted in these variant examples, provision of items such as direction regulating portion 52 or spray plate 61 as a spray direction determining means for determining the direction of spray water from a showerhead enables fan-shaped spraying of hot or cold water regardless of the wall thickness of outer cylinder 41, thereby affording a comfortable shower.

Next we discuss a third embodiment of the showerhead of the present invention.

Figure 9:
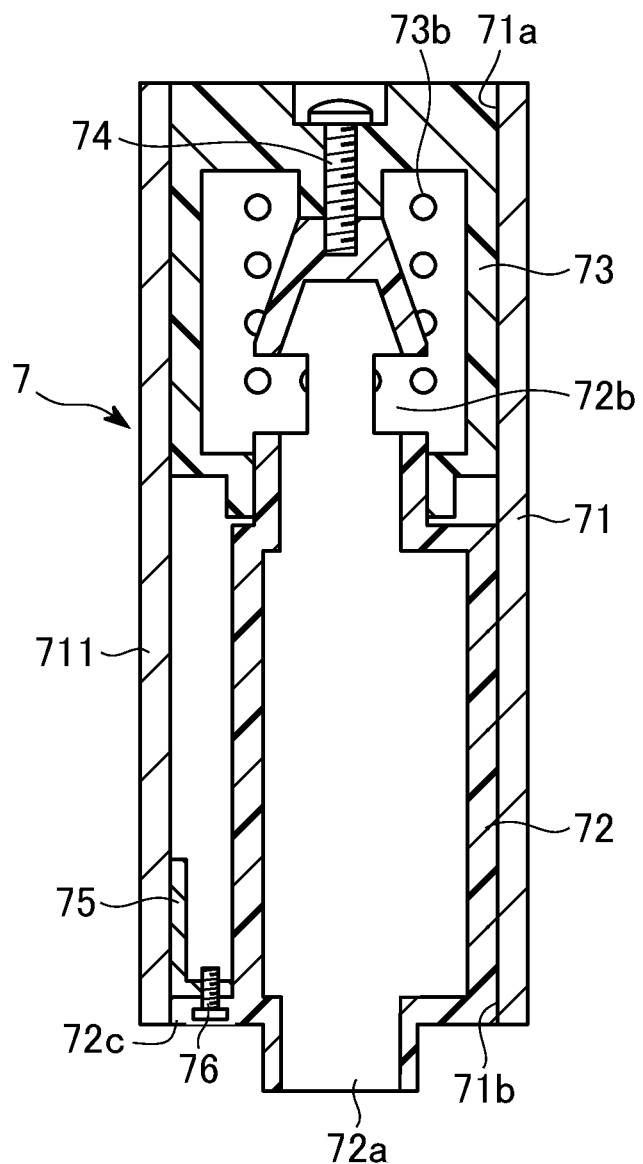
FIG. 9: A sectional schematic showing a showerhead according to a third embodiment of the present invention.
Figure 10:
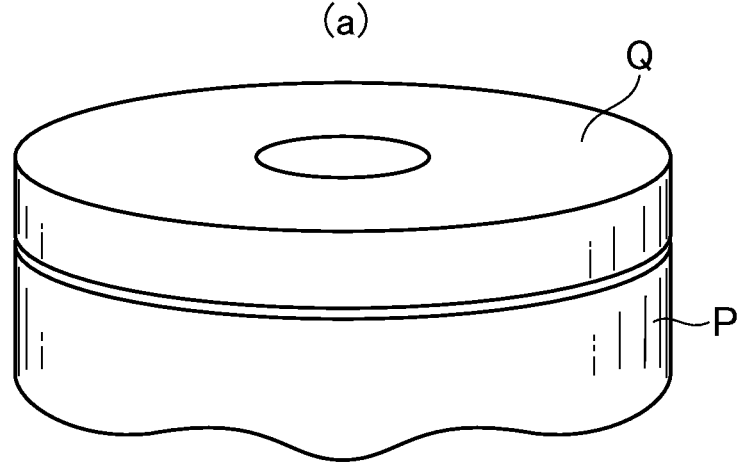
FIG. 10: A perspective drawing showing the front end portion of the showerhead, wherein (a) shows the front end portion of the showerhead using conventional plastic plating; and (b) shows the front end portion of the showerhead shown in FIG. 9.
Figure 10:
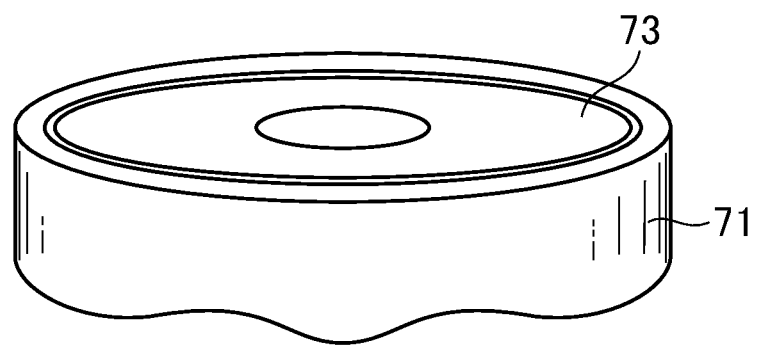

FIG. 9 is a sectional schematic diagram of a showerhead pertaining to a third embodiment; FIG. 10 is a perspective drawing showing the front end portion of the showerhead, wherein (a) shows the front end portion of the showerhead using conventional plastic plating; and (b) shows the front end portion of the showerhead shown in FIG. 9.

The shower apparatus of the present embodiment comprises: an outer cylinder 71 forming the shell of a showerhead 7; a water conduit member 72 inserted into and engaged with the base end portion of the outer cylinder 71 for directing hot or cold water supplied from shower hose 1 into outer cylinder 71; and a spray member 73 serving as a spray portion having multiple spray holes 73b engaging the front end portion of outer cylinder 71 and spraying hot or cold water in a shower form.

Outer cylinder 71 is a member formed from a metal such as SUS304. In the present embodiment, a pipe material (electric resistance welded pipe) obtained by roll forming a metal plate material is furthermore plastically deformed by bulge forming or the like to expand the front end portion of the pipe and form an outer cylinder 71. Note that seamless pipe material obtained by extrusion or drawing rather than roll forming may also be used.

An outer cylinder 71 with a wall thickness of approximately 0.5 mm to 1 mm can thus be formed, thereby achieving a lighter weight than conventional showerheads. Material and manufacturing costs, transport costs, and the like can thus be reduced, so that metal showerheads can be provided at a lower cost than in the past. By reducing the weight of the showerhead, the volume of $CO_2$ generated during transport can also be reduced.

Formation of outer cylinder 71 from a lustrous metal such as SUS304 enables the manufacture of a high quality metal showerhead without ornamental surface plating such as chrome plating or the like as would be the case with brass. Hence there is no risk that plating will peel, as with conventional showerheads with metallic exterior appearances achieved through nickel-chrome plating or the like.

This outer cylinder 71 is referred to as gripping portion 711, having a diameter allowing for easy gripping by hand on the base end portion side. Also, welded onto the inner circumferential surface of outer cylinder 71 is an affixing base 75, positioned a predetermined distance away from opening portion 71b on the base end portion and formed of the same material as outer cylinder 71, for affixing a water conduit member 72 to outer cylinder 71.

Water conduit member 72 is molded of resin; connected at one end thereof is shower hose 1, on which a water intake port 72a is formed for receiving the supply of hot or cold water; formed at the other end is a water discharge port 72b for discharging the supplied hot or cold water to a chamber in a spray member 73. A flange 72c extending toward the inner circumferential surface of outer cylinder 71 is formed on the water input port 72a side. This flange 72c is formed to have approximately the same dimensions as the inner circumference of outer cylinder 71 opening portion 71b, and the thickness thereof is made the same as the dimension from opening portion 71b on the base end portion side up to affixing base 75.

Note that shower hose 1 is attached to water conduit member 72 water input port 72a via socket 2.

Spray member (spray portion) 73 is an injection molded resin part having within it a hollow space (chamber) for passing through the hot or cold water; this is fitted onto to the front end portion of outer cylinder 71. On spray member 73, multiple spray holes 73b for spraying the introduced hot or cold water are formed on the surface exposed on the outside of outer cylinder 71. The shape of front end portion on spray member 73 is formed to have approximately the same dimensions as the inner circumference of outer cylinder 71 opening portion 71a.

These water conduit member 72 and spray members 73 are inserted into outer cylinder 71 from opening portions 71a, 71b formed at both end portions of outer cylinder 71.

When assembling the showerhead, water conduit member 72 is first inserted into outer cylinder 71, and when water conduit member 72 hits affixing base 75, water conduit member 72 flange 72c and affixing base 75 are joined using joining hardware 76 such as a screw or the like, and water conduit member 72 is affixed to outer cylinder 71. Spray member 73 is inserted from opening portion 71a on the front end portion of outer cylinder 71 until it hits water conduit member 72; spray member 73 and water conduit member 72 are linked using joining hardware 74 such as a screw or the like, and spray member 73 is affixed to water conduit member 72. Water conduit member 72 and spray member 73 are thus affixed to outer cylinder 71.

Water conduit member 72 and spray member 73 are both formed at approximately the same dimensions as the inner circumference of outer cylinder 71 opening portions 71a and 71b. The distance between opening portion 71b at the base end portion side of outer cylinder 71 and affixing base 75 is the same dimension as the thickness of the water conduit member 72 flange 72c. Water conduit member 72 and spray member 73 can be completely inserted into outer cylinder 71 while plugging opening portions 71a, 71b. By virtue of fully inserting water conduit member 72 and spray member 73 into outer cylinder 71, there is no exposure of water conduit member 72 and spray member 73 even when viewed from the side surface of outer cylinder 71.

In conventional showerheads with decorative plating, as shown in FIG. 10(a), the end surface of the metallic showerhead P was covered by a resin member Q so as to prevent shock to the end portion of the plated part, and plating was thus prevented from peeling off. However in the present embodiment, as shown in FIG. 10(b), the end surface of outer cylinder 71 is not covered by a resin member (water conduit member 72, spray member 73), and is exposed to the outside. Therefore except for the part on which the spray holes are formed, no resin line appears on the showerhead front end portion, since the water conduit member 72 and spray member 73 are not exposed. Therefore design characteristics can be improved relative to conventional showerheads.

Figure 11:
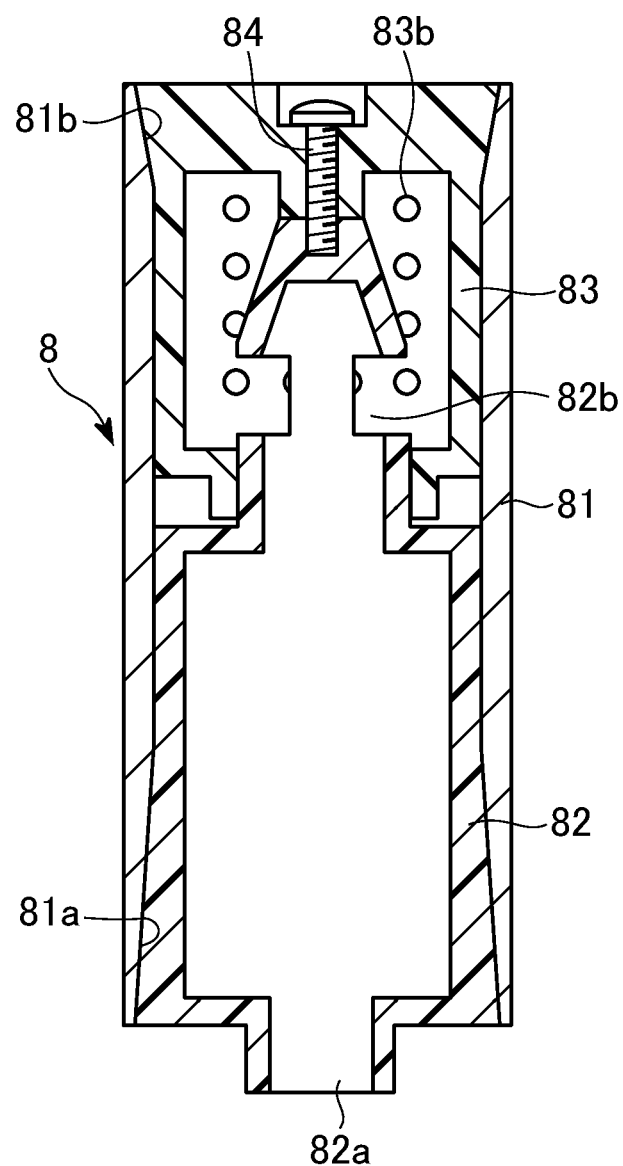
FIG. 11: A sectional schematic showing a variant example of a showerhead according to the third embodiment.

FIG. 11 is a sectional schematic showing a variant example of the showerhead according to the third embodiment.

The shower apparatus of this variant example comprises an outer cylinder 81 forming the shell of a showerhead 8; a water conduit member 82 inserted into and engaged with the base end portion of outer cylinder 81 for directing hot or cold water supplied from shower hose 1 into outer cylinder 81; and a spray member 83 serving as a spray portion having multiple spray holes 83b engaging the front end portion of outer cylinder 81 and spraying hot or cold water in a shower shape.

Outer cylinder 81 is a member formed by plastic deformation using bulge forming or the like of a metal such as SUS304.

Outer cylinder 81 opening portion 81a and opening portion 81b are machined at the time of bulge forming so that the wall thickness of outer cylinder 81 gradually thins toward the front end portion, and is tapered so that the inside diameter of outer cylinder 81 increases toward the end portion.

Water conduit member 82 is made of resin; connected at one end thereof is the shower hose 1, on which a water intake port 82a is formed for receiving the supply of hot or cold water; formed at the other end is a water discharge port 82b for discharging the supplied hot or cold water to a chamber in a spray member 83. In addition, a sloped surface is formed on water conduit member 82 water discharge port 82b side so as to match the above-described tapered inner circumferential surface of outer cylinder 81.

Note that shower hose 1 is attached to water conduit member 82 water input port 82a via socket 2.

Spray member (spray portion) 83 is an injection molded resin part having within it a hollow space (chamber) for passing through the hot or cold water; this is fitted onto to the front end portion of outer cylinder 81. On spray member 83, multiple spray holes 83b for spraying the introduced hot or cold water are formed on the surface exposed on the outside of outer cylinder 81. A sloped surface shaped to match the above-described tapered inner circumferential surface of outer cylinder 81 is formed on the front end portion of spray member 83.

This water conduit member 82 and spray members 83 are inserted into outer cylinder 81 from opening portions 81a, 81b formed at both end portions of outer cylinder 81.

When assembling the showerhead, spray member 83 and water conduit member 82 are joined by joining hardware 84 such as screws or the like, with water conduit member 82 and spray member 83 inserted from openings 81a and 81b in outer cylinder 81. Water conduit member 82 and spray member 83 are furnished with sloping surfaces matching the tapered inner circumferential surface of outer cylinder 81, so that water conduit member 82 and spray member 83 are affixed so as not to move relative to outer cylinder 81 due to the linkage between water conduit member 82 and spray member 83.

It is of course the case that in this variant example as well, as in the third embodiment, water conduit member 82 and spray member 83 can be fully inserted into outer cylinder 81.

Figure 12:
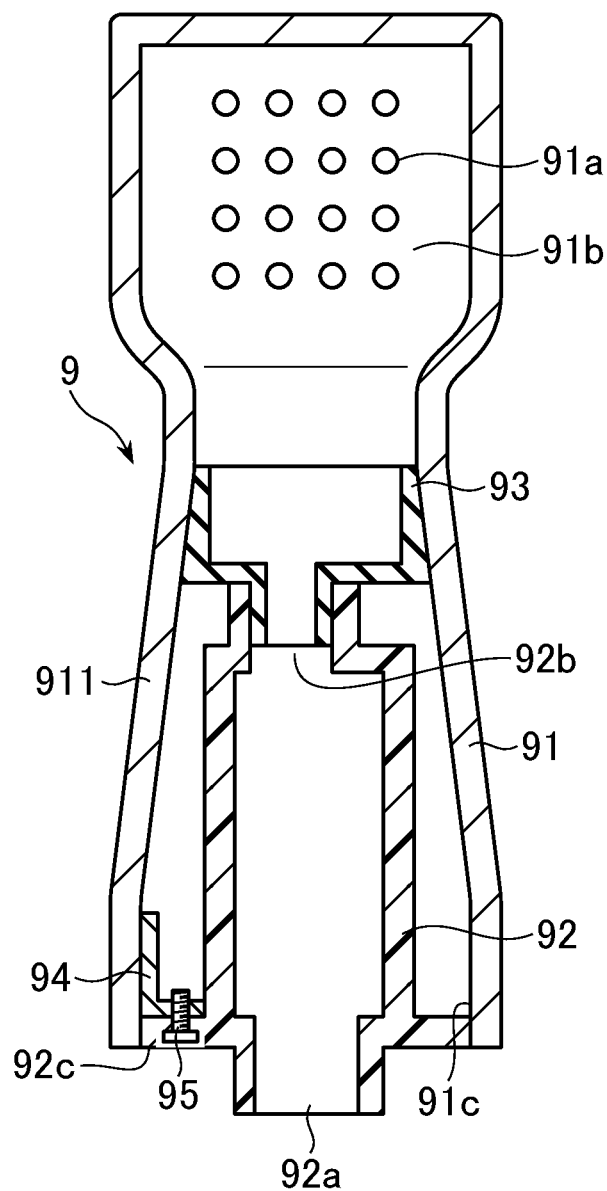
FIG. 12: A sectional schematic showing a showerhead according to a fourth embodiment of the present invention.

FIG. 12 is a sectional schematic showing a showerhead according to a fourth embodiment of the present invention.

The showerhead of the present embodiment comprises: an outer cylinder 91 forming the shell of a showerhead 9, on the front end portion side of which a spray portion 91b having multiple spray holes 91a is formed; and a water conduit member 92 for conducting hot or cold water supplied from shower hose 1 into outer cylinder 91.

Outer cylinder 91 is a member formed from a metal such as SUS304. The front end portion of the pipe material (electric resistance welded pipe) obtained by roll forming a metal plate material is sealed by welding or brazing of pipe material or other metal member to make a closed pipe, then further plastically deformed by bulge forming or the like to expand the front end portion of the pipe and form an outer cylinder. Alternatively, pipe material (electric resistance welded pipe) obtained by roll forming of metal plate material can be plastically deformed by bulge forming or the like, expanding and deforming the front end portion to form the outer cylinder. This outer cylinder 91 is made as a gripping portion 911, with a diameter affording easy holding by hand on the base end side; and the front end portion side thereof is made into a thin shape spray portion 91b, flatter and wider than gripping portion 911. Note that seamless pipe material obtained by extrusion or drawing rather than roll forming may also be used.

This enables the formation of a thin wall on outer cylinder 91, with a thickness of approximately 0.5 mm to 1 mm, thereby reducing weight compared to conventional showerheads. Material and manufacturing costs, transport costs, and the like can thus be reduced, so that metal showerheads can be provided at a lower cost than in the past. By reducing the weight of the showerhead, the volume of $CO_2$ generated during transport can also be reduced.

Because the entirety of showerhead 9 except for the part connected to shower hose 1 is covered with a seamless outer cylinder 91 formed of a lustrous metal such as SUS304, a good quality metal showerhead can be fabricated even without ornamentation using chrome plating or the like as is done with brass, etc. Hence there is no risk that plating will peel, as with conventional showerheads with metallic exterior appearances achieved through nickel-chrome plating or the like. Except for the base end portion, no member-to-member seam appears on the surface of showerhead 9, therefore dirt does not cake on seams, and the showerhead conveys a highly sanitary impression.

This outer cylinder 91 is referred to as gripping portion 911, having a diameter allowing for easy gripping by hand on the base end portion side. Also, welded onto the inner circumferential surface of outer cylinder 91 is an affixing base 94, formed of the same material as the outer cylinder 91 a predetermined distance away from opening portion 91c, for affixing water conduit member 92 to outer cylinder 91.

Water conduit member 92 is molded of resin; connected at one end thereof is a socket 2, on which a water intake port 92a is formed for receiving the supply of hot or cold water; formed at the other end thereof is a water discharge port 92b for discharging the supplied hot or cold water. Water conduit member 92 is inserted into outer cylinder 91 from the opposite end to that on which water discharge port 92b is formed, and is affixed to outer cylinder 91.

The front end of water conduit member 92 is pressed into outer cylinder 91 via a packing 93. Therefore hot or cold water spouted from water conduit member 92 spouting port 92b does not penetrate into the gap between outer cylinder 91 and water conduit member 92.

In the showerhead of the present invention, hot or cold water spouted from water conduit member 92 spouting port 92b is guided over the inner circumferential surface of outer cylinder 91 to spray holes 91a. I.e., outer cylinder 91 functions as a hot or cold water conduit.

Thus with respect to showerhead 9 outer cylinder 91, water conduit member 92, being a resin molded part, is disposed on the base end portion side only, therefore the center of gravity of showerhead 9 is positioned on gripping portion 911, so that the sense of stability gained when holding showerhead 9 by hand is increased compared to conventional showerheads.

This water conduit member 92 is inserted into outer cylinder 91 from an opening portion 91c formed in outer cylinder 91.

When assembling the showerhead, water conduit member 92 is first inserted into outer cylinder 91, and when water conduit member 92 hits affixing base 95, water conduit member 92 flange 92c and affixing base 95 are joined using joining hardware 96 such as a screw or the like, and water conduit member 92 is affixed to outer cylinder 91.

This water conduit member 92 is formed to have approximately the same dimensions as the inner circumference of outer cylinder 91 opening portion 91c. The distance between opening portion 91b of outer cylinder 91 and affixing base 94 is the same dimension as the thickness of water conduit member 92 flange 92c. Water conduit member 92 can be completely inserted into outer cylinder 91 while plugging opening portion 91c. By completely inserting water conduit member 92 into outer cylinder 91, water conduit member 92 is not exposed even if viewed from the side of outer cylinder 91. A joint surface between metal and resin, which is to say a resin line, does not therefore appear on the side surface of the showerhead. Therefore design characteristics can be improved relative to conventional showerheads.

Next, referring to FIGS. 13 through 21, we discuss a showerhead according to a fifth embodiment of the present invention.

Figure 13:
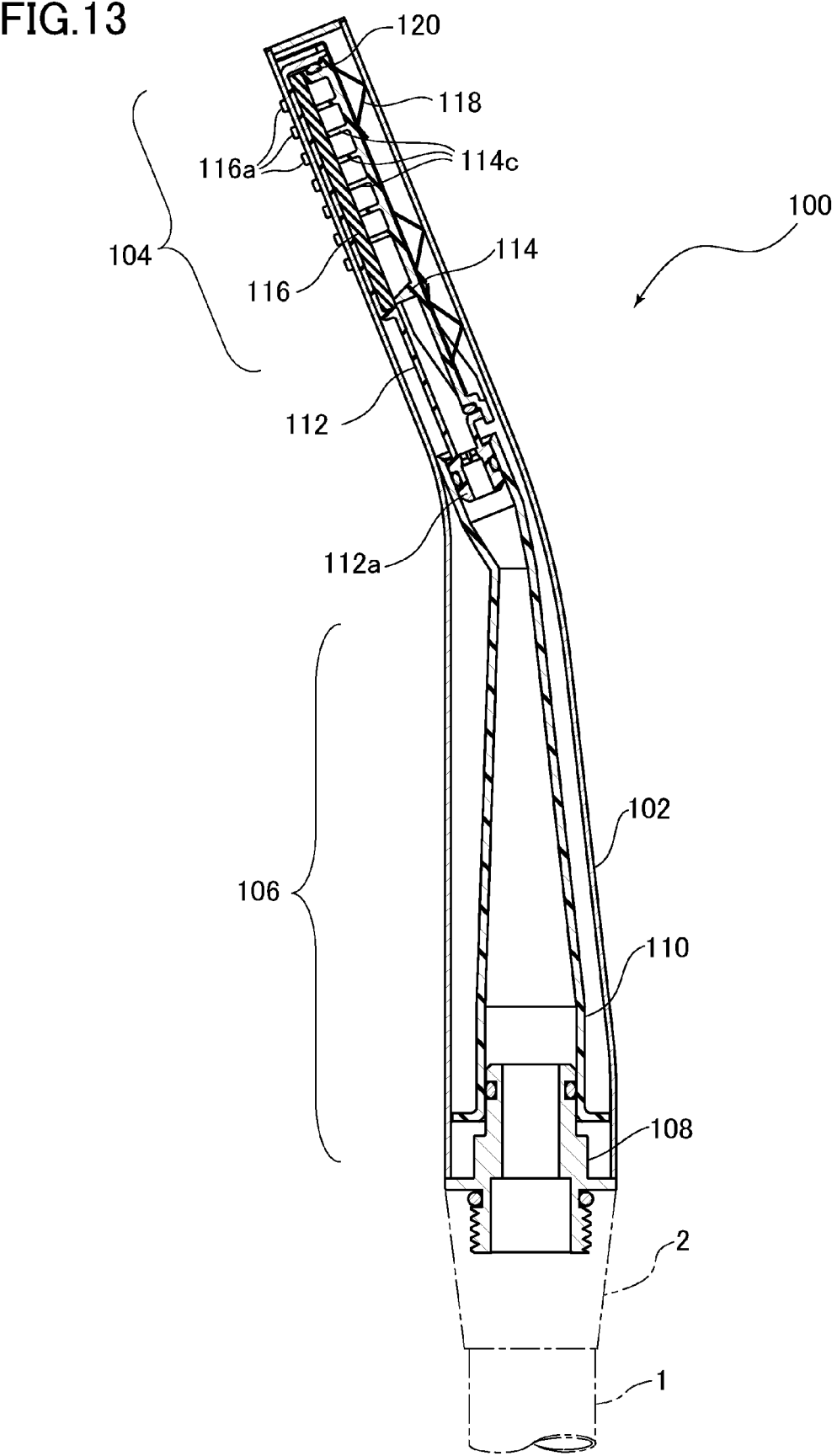
FIG. 13: A full sectional diagram showing a showerhead according to a fifth embodiment of the present invention.

FIG. 13 is a full sectional diagram showing a showerhead according to a fifth embodiment of the present invention.

As shown in FIG. 13, showerhead 100 of the present embodiment is a showerhead for a hand shower, used by connecting to a shower hose 1 via a socket 2. Outer cylinder 102, which forms a housing for showerhead 100, is constituted by plastic deformation of SUS304 steel plate, and no decorative plating is applied to the surface thereof. A spray portion 104 for spraying hot or cold water is disposed on the front end portion of showerhead 100, and a gripping portion 106 is formed on the base portion side thereof to allow users to grip same with fingers.

As shown in FIG. 13, showerhead 100 has an outer cylinder 102, a connecting pipe 108 attached to this outer cylinder 102, a water conduit 110 disposed inside outer cylinder 102, a spray chamber-forming member 112, a hold-down cover 114, and a spring member 118. Here water conduit 110, spray chamber-forming member 112, and hold-down cover 114 function as a water conduit member for supplying hot or cold water supplied from shower hose 1 into outer cylinder 102.

Next, referring to FIGS. 14 through 20, we discuss the structure of each part of a showerhead 100 according to a fifth embodiment of the present invention.

Figure 14:
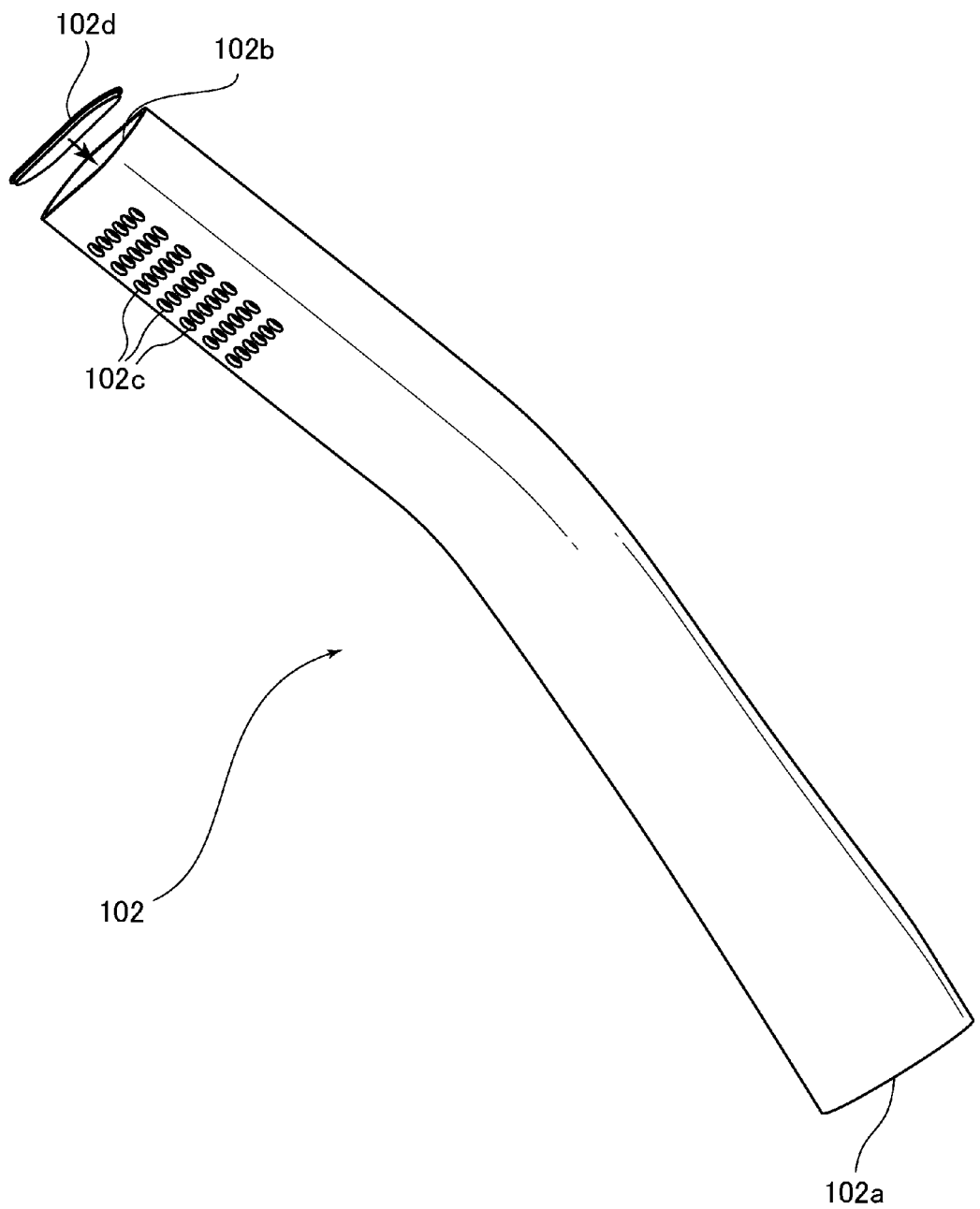
FIG. 14: A perspective view of an outer cylinder of the showerhead.
Figure 15:
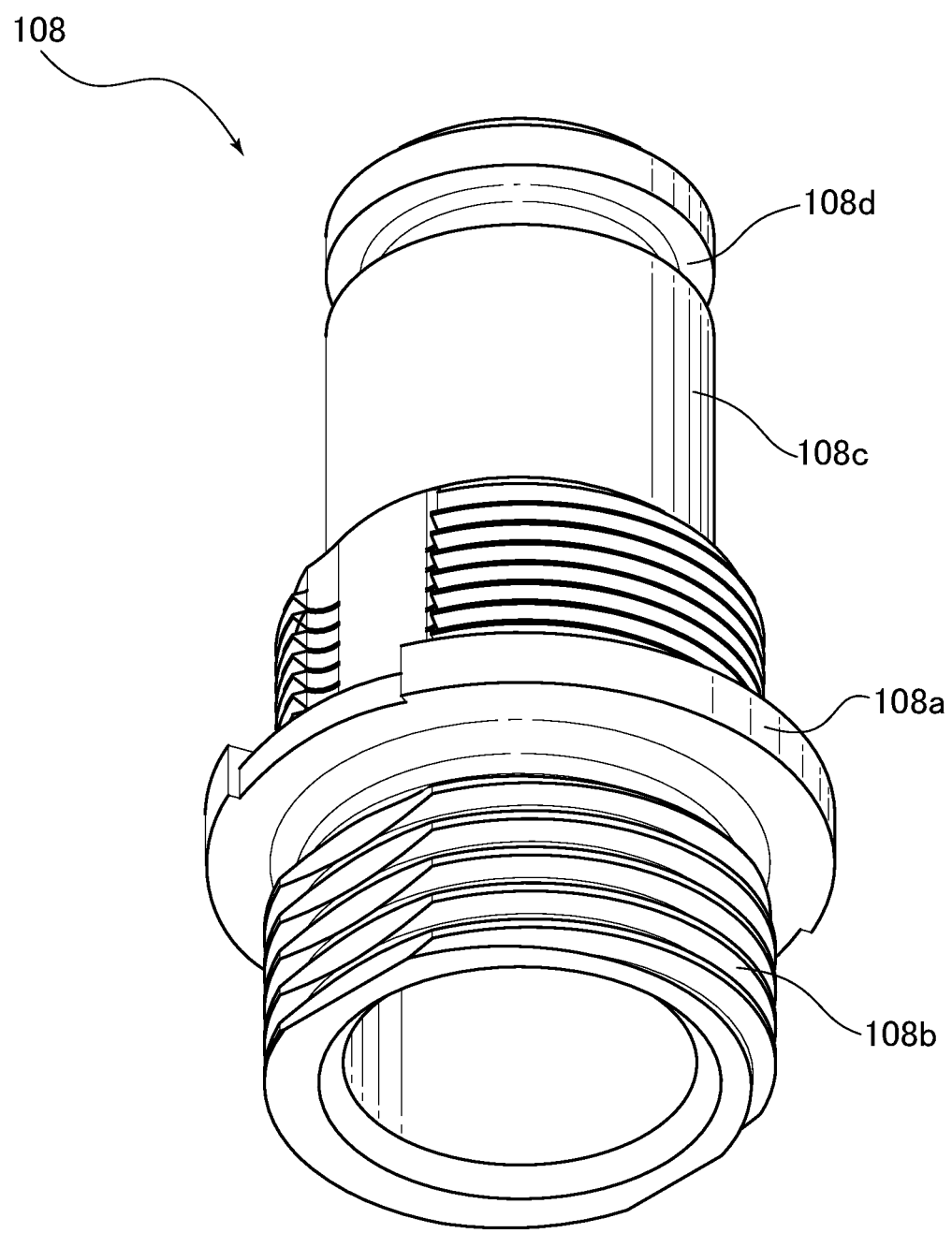
FIG. 15: A perspective view of a showerhead connecting pipe.
Figure 16:
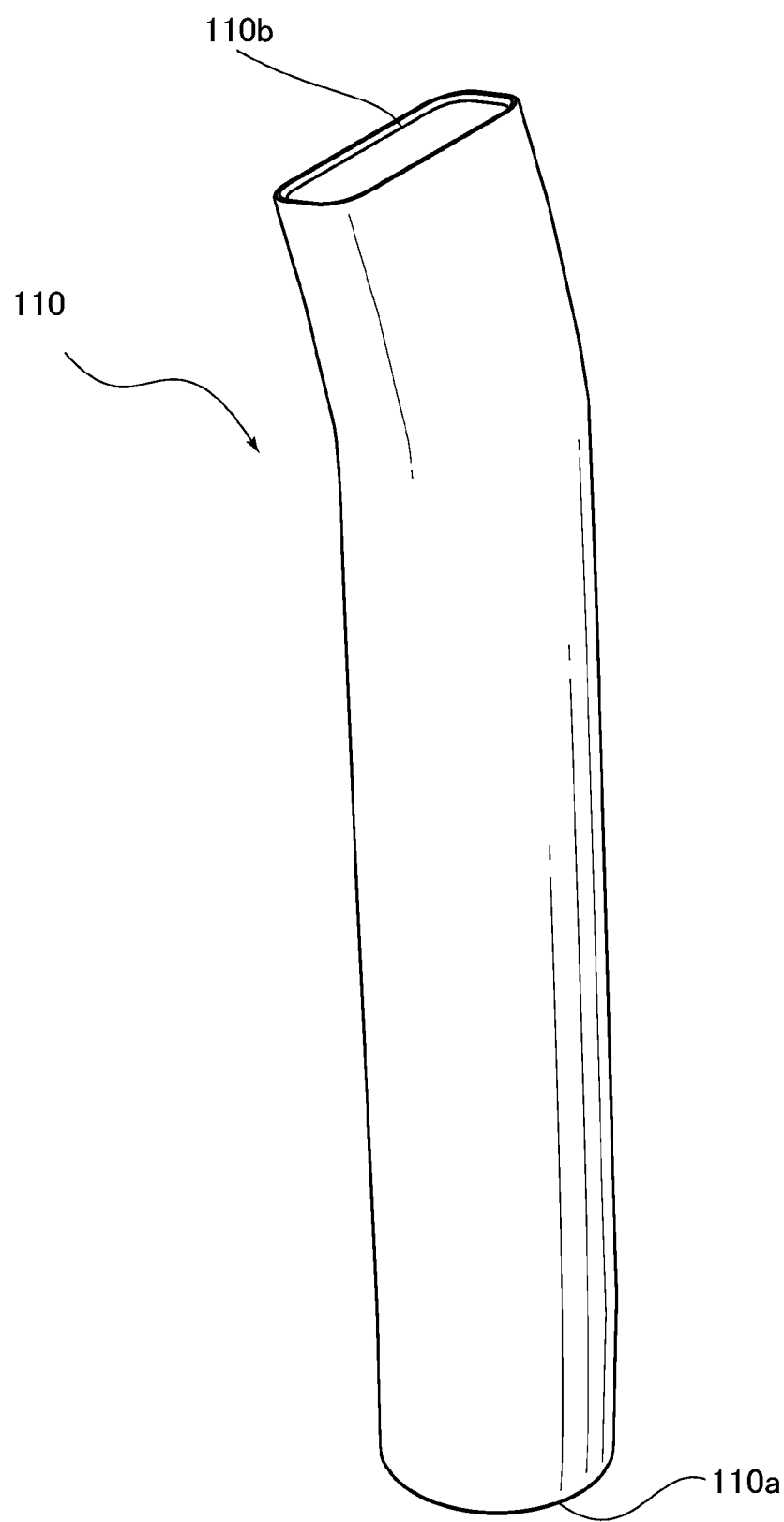
FIG. 16: A perspective view of a water conduit built into the showerhead.
Figure 17:
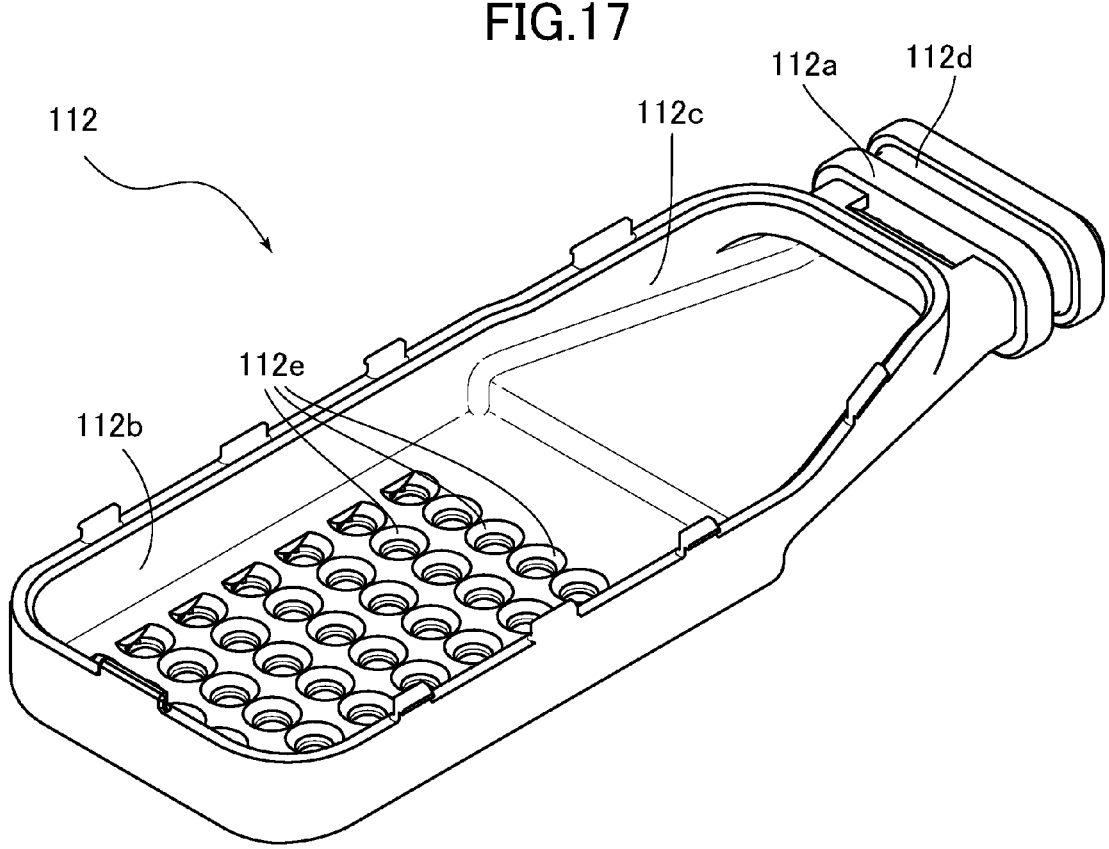
FIG. 17: A perspective view of a spray chamber-forming member built into the showerhead.
Figure 18:
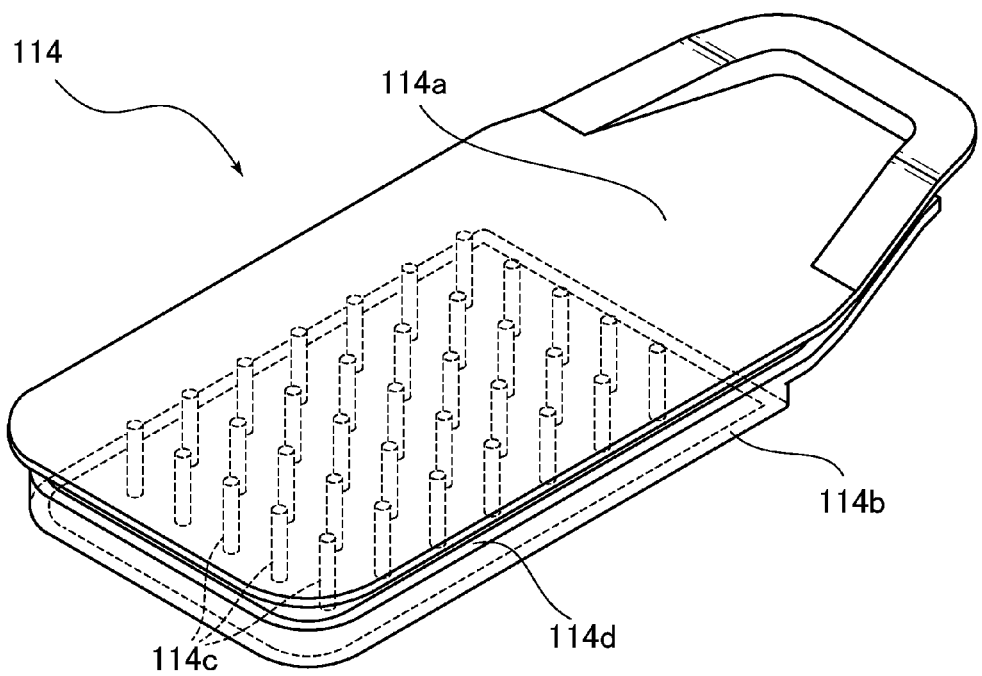
FIG. 18: A perspective view of a hold-down cover built into the showerhead.
Figure 19:
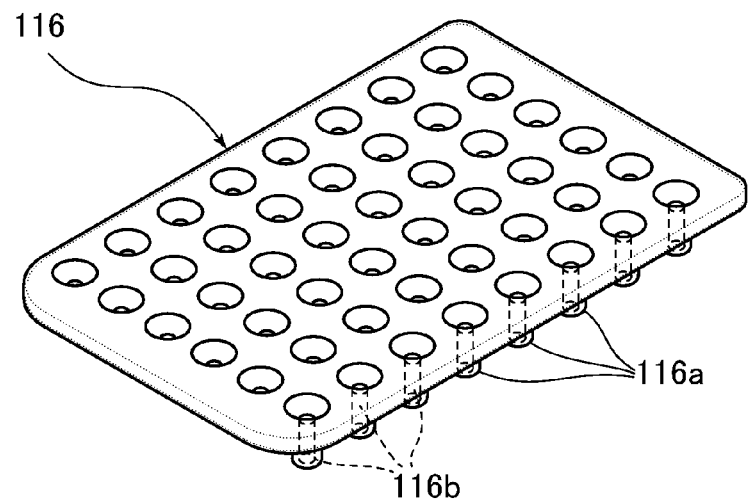
FIG. 19: A perspective view of a spray plate built into the showerhead.
Figure 20:
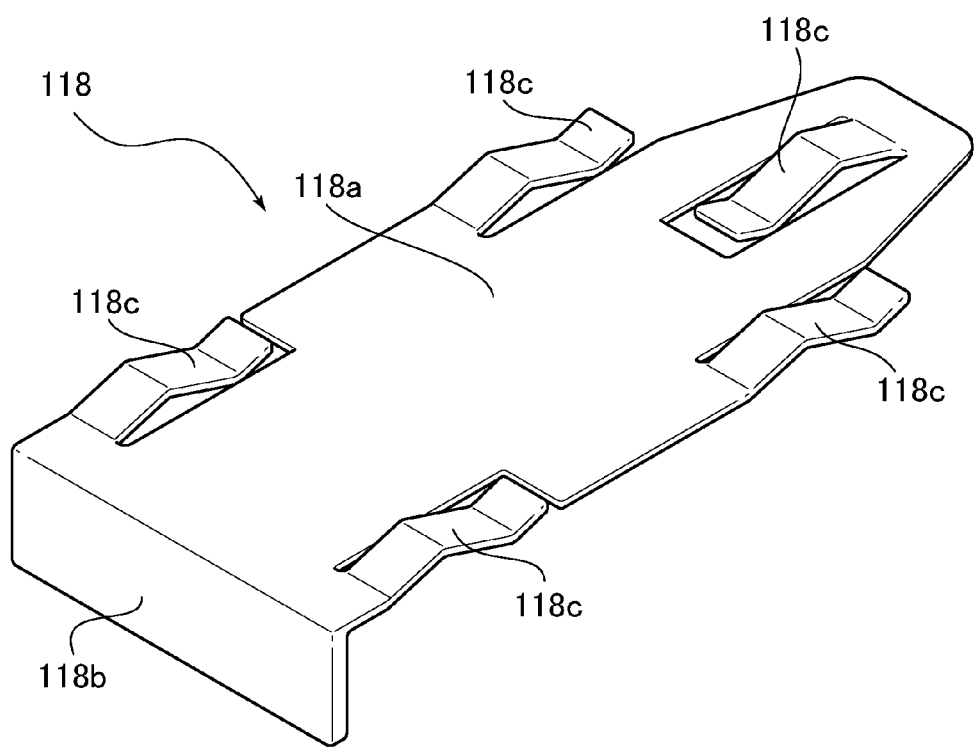
FIG. 20: A perspective view of a spring member built into the showerhead.

FIG. 14 is a perspective view of outer cylinder 102; FIG. 15 is a perspective view of connecting pipe 108; FIG. 16 is a perspective view of water conduit 110; FIG. 17 is a perspective view of spray chamber-forming member 112; FIG. 18 is a perspective view of hold-down cover 114; FIG. 19 is a perspective view of spray plate 116; FIG. 20 is a perspective view of spring member 118.

As shown in FIG. 14, outer cylinder 102 is a cylindrical member made of metal; base end portion 102a and front end opening portion 102b thereof are left open. Base end portion side of outer cylinder 102 is formed to be generally circular in section, and constitutes gripping portion 106 of showerhead 100. The front end portion side, on the other end, is flatter than the gripping portion, and constitutes a spray portion 104 having a broad and generally rectangular section. Between the generally circular section on the base end side and the generally rectangular section on the front end portion side, there is a smooth transition from a circular to a flattened rectangular section. In addition, multiple spray holes 102c are formed on the wide side surface of outer cylinder 102. As will be described below, front end opening portion 102b is closed by welding a metal member 102d after placement of a water conduit member inside outer cylinder 102.

As shown in FIG. 15, connecting pipe 108 is a generally cylindrical member made of metal. A generally disk-shaped flange portion 108a is formed on an intermediate portion of connecting pipe 108; the opening portion on the base end side of outer cylinder 102 is covered by welding the outer perimeter of this flange portion 108a to base end portion 102a on outer cylinder 102. Also, a male screw portion 108b is formed at the base end portion of connecting pipe 108, and shower hose 1 is joined to showerhead 100 by the screwing of socket 2 onto this male screw portion 108b (FIG. 13). Furthermore, a cylindrical water conduit connecting portion 108c is formed on the front end side of connecting pipe 108, and communication between connecting pipe 108 and water conduit 110 is established by the insertion of this water conduit connecting portion 108c into the base end portion of water conduit 110. There is also a channel 108d formed on the outer perimeter of water conduit connecting portion 108c; water tightness is secured between connecting pipe 108 and water conduit 110 by disposing an O ring in this channel 108d (FIG. 13).

As shown in FIG. 16, water conduit 110 is an elongated cylindrical member made of resin. The base end portion side of water conduit 110 is formed to be generally circular in section, and the front end portion side thereof is formed to be generally rectangular in section. As described above, connecting pipe 108 is inserted into a base end portion 110a on water conduit 110, while a water conduit connecting portion 112a (FIG. 17) on spray chamber-forming member 112 is inserted into front end portion 110b of water conduit 110 and joined (FIG. 13).

As shown in FIG. 17, spray chamber-forming member 112 is a generally thin, box-shaped member, and a generally cuboid spray chamber is formed on the interior thereof by the attachment of hold-down cover 114. A water conduit connecting portion 112a is formed at the base end side of spray chamber-forming member 112, and a spray chamber portion 112b is formed on the front end side thereof. A connecting portion 112c is formed to establish communication between water conduit connecting portion 112a and spray chamber portion 112b.

Water conduit connecting portion 112a is a cylinder with a generally rectangular section which communicates with water conduit 110 by insertion into front end portion 110b of water conduit 110. A channel 112d is formed on the outer perimeter of water conduit connecting portion 112a; water tightness is secured between water conduit connecting portion 112a and water conduit 110 by disposing packing in this channel 112d (FIG. 13).

Connecting portion 112c is a flow path connecting water conduit connecting portion 112a and spray chamber portion 112b, and is formed to spread in a tapered shape from water conduit connecting portion 112a toward spray chamber portion 112b.

Spray chamber portion 112b is formed to be generally cuboid, and is furnished with multiple round holes 112e on its bottom surface. Each of the round holes 112e is positioned to align with each of the spray holes 102c provided on outer cylinder 102 when spray chamber-forming member 112 is placed within outer cylinder 102. Connecting portion 112c and the open ceiling surface of spray chamber portion 112b is closed off by hold-down cover 114 (FIG. 18).

As shown in FIG. 18, hold-down cover 114 is a flat member with an edging, constituted to close off the open portion of spray chamber-forming member 112. Hold-down cover 114 has a flat sheet-shaped portion 114a and an edging portion 114b formed around the perimeter edge portion of sheet-shaped portion 114a. The insertion of edging portion 114b into the open portion of spray chamber-forming member 112 results in covering of the open portion by sheet-shaped portion 114a. Furthermore, multiple pins 114c are disposed on sheet-shaped portion 114a facing toward the inside of the spray chamber. Pins 114c are disposed in a lattice on sheet-shaped portion 114a; the front ends thereof are arranged to contact the back surface of spray plate 116, which is disposed inside the spray chamber (FIG. 13). The rows and columns of the arrayed pins 114c are arrayed to be positioned between the rows and columns of round holes 112e (spray holes 102c) arrayed in a lattice. Spray plate 116 is thus held down by pins 114c without pins 114c blocking spray holes 102c.

Furthermore, a channel 114d is formed on the outer perimeter of edging portion 114b; by disposing packing 120 (FIG. 13) in this channel 114d, water tightness is secured between spray chamber-forming member 112 and hold-down cover 114.

As shown in FIG. 19, spray plate 116, being a spray direction regulating means, is a plate-shaped member made of silicon rubber, serving as an elastic body. Multiple spray nipples 116a arrayed in a lattice are provided on this spray plate 116. Spray nipples 116a are generally cylindrical, and are positioned to align with each of the round holes 112e provided on spray chamber-forming member 112, and with each of the spray holes 102c provided on outer cylinder 102. Therefore when spray plate 116 is disposed on the bottom surface of spray chamber-forming member 112, spray nipples 116a project outside of outer cylinder 102, passing through round holes 112e on spray chamber-forming member 112 and spray holes 102c on outer cylinder 102. Spray nozzle holes 116b are provided on the center axis line of each of the respective spray nipples 116a. Hot or cold water supplied into the spray chamber is sprayed through these spray nozzle holes 116b. The direction in which hot or cold water is sprayed is generally regulated by passage of hot or cold water through each of the spray nozzle holes 116b, therefore spray plate 116 functions as a spray direction regulating means. When spray plate 116 is disposed on the bottom surface of spray chamber-forming member 112 and hold-down cover 114 is attached spray chamber-forming member 112, the front ends of pins 114c provided on hold-down cover 114 press the rear surface of spray plate 116 (the side on which spray nipples 116a are disposed). This causes spray plate 116 to be pressed and sealed onto the bottom surface of spray chamber-forming member 112.

As shown in FIG. 20, spring member 118 comprises thin metal plate, which is caused to act as a plate spring by bending a portion of the metal plate. Spring member 118 has a flat portion 118a and a bent portion 118b, being the bent portion at the front end of flat portion 118a. Flat portion 118a is disposed so as to be superimposed on hold-down cover 114, and is formed to have generally the same shape as hold-down cover 114. Furthermore, cutouts are provided on flat portion 118a, thus forming five rectangular plate springs 118. Each of the plate springs 118 is a cantilevered beam molded into a "V" shape at two intermediate spots, one end of which is connected to flat portion 118a.

The spray chamber is externally biased by overlaying spring member 118 onto the rear surface of hold-down cover 114 and causing the bent corners of plate springs 118 to contact the inner wall surface on the rear side of outer cylinder 102 (FIG. 13). Thus hold-down cover 114, as well as spray chamber-forming member 112 attached thereto, and spray plate 116, are pressed into the inner wall surface on the front surface side of outer cylinder 102. Through the pressing of spray plate 116 into the inner wall surface of outer cylinder 102 via hold-down cover 114 by spring member 118, spray nipples 116a on spray plate 116 are reliably made to project out from spray holes 102c.

Figure 21:
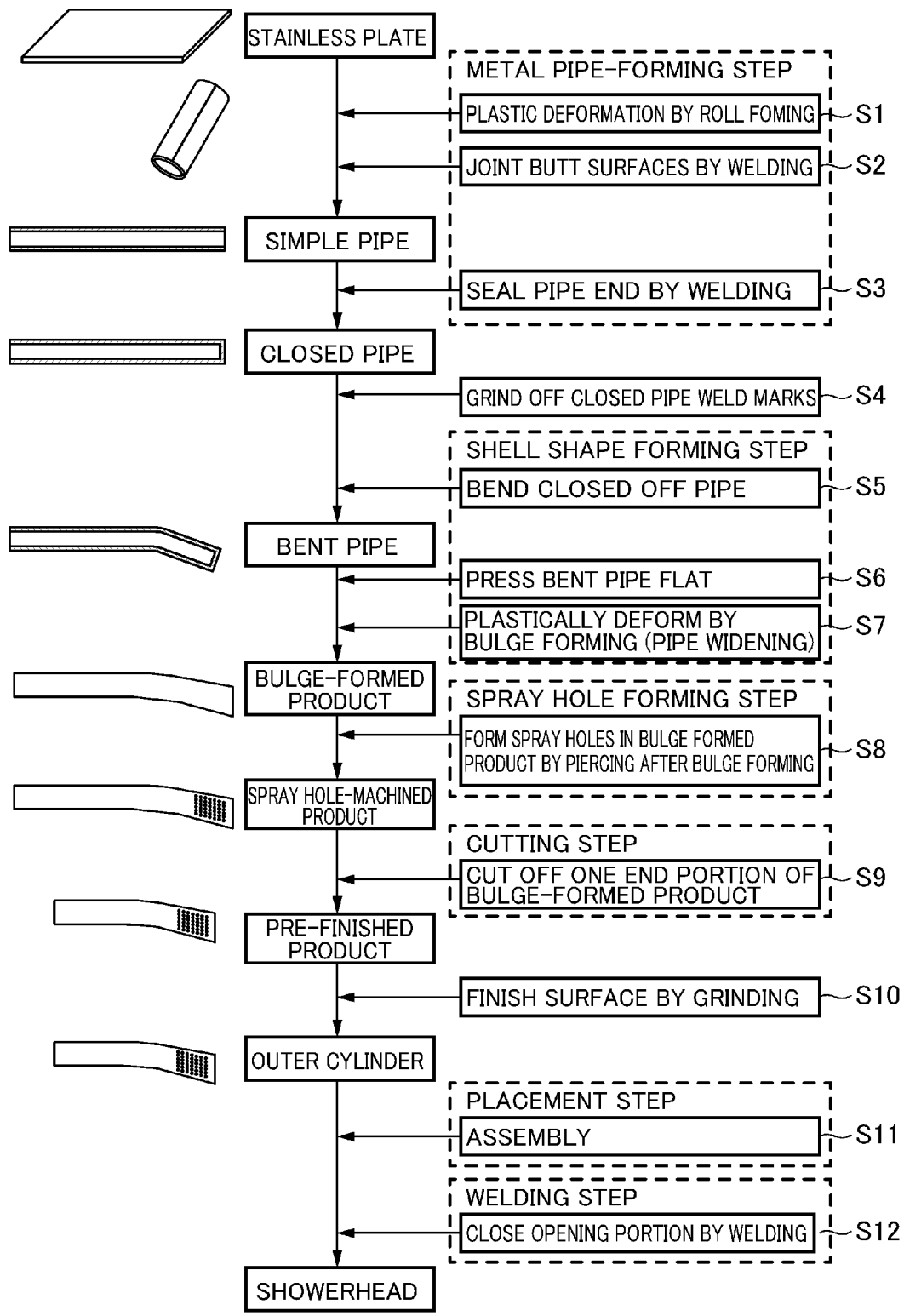
FIG. 21: A diagram showing a manufacturing procedure for a showerhead according to a fifth embodiment.

Next, referring to FIG. 21, we discuss a method for manufacturing a showerhead 100 according to the present embodiment. FIG. 21 is a diagram showing the procedure for manufacturing showerhead 100.

First, in step S1 of FIG. 21, stainless steel flat plate is plastically deformed by roll forming and machined into a cylindrical shape.

Next, in step S2, the butt surfaces of the stainless plate plastically deformed into a cylindrical shape are joined by welding. A raw stainless pipe, being a metal pipe, is thus formed.

In step S3, a stainless plate is welded to the front end of the formed pipe to close the front end of the pipe. A blanked off pipe is thus formed. Note that in the present embodiment, steps S1 through S3 above are referred to as the metal pipe forming step.

Next, in step S4, welding marks on the blanked off pipe are removed by grinding.

In step S5, the blanked-off pipe is bent to form a bent pipe.

In step S6, the front end portion of the bent pipe is deformed into a flattened shape by press forming.

Next, in step S7, the bent pipe, deformed into a flat shape, is bulge-formed. I.e., the bent pipe, deformed into a flat shape, is loaded into a bulge-forming mold, and the mold is closed. Furthermore, a filler of some liquid or the like is injected into the bent pipe and the filler subjected to high pressure at a maximum of approximately 200 MPa, expanding and plastically deforming the bent pipe. This causes the bulge-formed bent pipe to be formed into a bulged-formed product with approximately the same shape as the mold cavity. Note that in the present embodiment, steps S5 through S7 above are referred to as the shell forming step.

In step S8, immediately after plastic deformation by bulge forming, piercing is conducted with high pressure applied to the filler in the mold. In the piercing step, spray holes 102c are formed by the insertion of piercing pins from outside the bulge-formed product. A spray hole-formed product is thus obtained. Note that in the present embodiment, step S8 is referred to as the spray hole forming step.

Next, in step S9, the blanked-off portion of the front end of the spray hole-formed product is cut off, thus opening the front end portion. A pre-machined product is thus obtained. Note that in the present embodiment, step S9 is referred to as the cutting step.

In step S10, surface finishing is carried out by grinding the surface of the pre-machined product. This results in the formation of an outer cylinder 102 on which the front end portion is open.

Next, in step S11, water conduit members such as spray chamber-forming member 112 are disposed inside the outer cylinder 102 on which the front end portion is open. I.e., after disposing spray plate 116 in spray chamber-forming member 112, hold-down cover 114 is attached to the open portion of spray chamber-forming member 112, mediated by packing 120, to form an assembled unit. This assembled unit is inserted and placed from the open portion at the front end of outer cylinder 102. When the assembled unit is inserted up to a predetermined position on the outer cylinder 102, spray nipples 116a on spray plate 116 are aligned with spray holes 102c on outer cylinder 102, and spray nipples 116a project out from spray holes 102c. In this state, spring member 118 is inserted between hold-down cover 114 and the inner wall surface of outer cylinder 102. When spring member 118 is inserted, hold-down cover 114 is pressed down by the biasing force of spring member 118, and spray chamber-forming member 112 is pressed into the inner wall surface on the opposite side from spring member 118 on outer cylinder 102. The assembled unit is thus accurately positioned and affixed within outer cylinder 102.

At the same time, connecting pipe 108 is inserted through an O ring into the base end portion 110a of water conduit 110. Next, water conduit 110 attached to connecting pipe 108 is inserted from the base end portion 102a opened on outer cylinder 102. When water conduit 110 is inserted to a predetermined position, the water conduit connecting portion 112a of spray chamber-forming member 112 is inserted within front end portion 110b on water conduit 110. Because of the installation of packing in water conduit connecting portion 112a, water conduit connecting portion 112a and water conduit 110 are connected in a watertight fashion when water conduit connecting portion 112a is received into the front end portion 110b of water conduit 110. Note that in the present embodiment, step S11 is referred to as the positioning step.

Next, in step S12, a metal member is laser-welded to the open portion at the front end of outer cylinder 102, closing the open portion. In addition, connecting pipe 108 flange portion 108a is welded to outer cylinder 102 base end portion 102a to complete the showerhead 100. YAG laser welding or fiber laser welding are preferably used for laser welding. A good welded surface can thus be obtained, and grinding of the laser welded portion can be omitted. Note that in the present embodiment, step S12 is referred to as the welding step.

Next, referring to FIG. 13, we discuss the operation of showerhead 100 according to the present embodiment.

First, showerhead 100 of the present embodiment is used by connection to shower hose 1 via socket 2. Hot or cold water supplied from shower hose 1 flows into water conduit 110 through connecting pipe 108. Hot or cold water flowing into water conduit 110 passes through water conduit connecting portion 112a on spray chamber-forming member 112 and flows into a spray chamber, being a space constituted between spray chamber-forming member 112 and hold-down cover 114. Hot or cold water flowing into the spray chamber passes through spray nozzle holes 116b disposed on spray plate 116 and is sprayed. The direction of the sprayed hot or cold water is regulated by spray nozzle holes 116b. Silicon rubber spray plate 116 is pressed into the bottom surface of spray chamber-forming member 112 by multiple pins 114c disposed on hold-down cover 114, therefore hot or cold water in the spray chamber enters between spray plate 116 and the bottom surface of spray chamber-forming member 112, and leakage from the gap between spray nipples 116a and round holes 112e can be prevented. If impurities in the hot or cold water adhere as scale to the interior of spray plate 116, blocking spray nozzle holes 116b, the scale can be removed by gripping the spray nipples 116a projecting out from outer cylinder 102 with fingers and deforming them.

Using the showerhead 100 of the fifth embodiment of the present invention, spray nipples 116a of spray plate 116 can be formed of a silicon rubber elastic body, therefore when scale adheres to spray nozzle holes 116b resulting in clogging or the like of spray nozzle holes 116b, the scale can be peeled off by grasping spray nipples 116a with the fingers and plastically deforming same. With the provision of such a spray plate 116 as a spray direction regulating means, showerhead 100 spray portion 104 can be formed in a thin and compact manner.

Using the showerhead 100 of the present embodiment, spray plate 116 is pressed together with spray chamber-forming member 112 and hold-down cover 114 by spring member 118 into the inside wall surface of outer cylinder 102, so that spray nipples 116a reliably project out from the outer cylinder.

Furthermore, using the showerhead 100 of the present embodiment, spring member 118 biases water conduit members such as hold-down cover 114 from the outside of the spray chamber, therefore the time during which spring member 118 is in contact with hot or cold water is short, and corrosion by hot or cold water of spring member 118 can be prevented.

In addition, using the showerhead 100 of the present embodiment, the external appearance of showerhead 100 is uniformly metal, thus achieving a showerhead 100 with superior design attributes.

In addition, using the showerhead 100 of the present embodiment, front end opening portion 102b on the outer cylinder is closed by laser welding of metal member 102d, therefore the seam with metal member 102d is not prominent, and the aesthetic appearance of showerhead 100 can be improved. Adhesion of dirt to the seam portion can also be prevented.

Using the manufacturing method for the embodiment showerhead of the present invention, the external appearance of showerhead 100 is constituted by laser welding of a metal member 102d to front end opening portion 102b on outer cylinder 102, being a metal pipe, therefore a showerhead 100 can be manufactured with a uniform metal external appearance, and with a superior aesthetics free of noticeable seams. After disposing water conduit members such as spray chamber-forming member 112 inside an outer cylinder 102 formed to a predetermined shape, the front end opening portion 102b on outer cylinder 102, into which a water conduit member has been inserted, is closed. The shape of the water conduit member is thus not prone to be limited by the shape of outer cylinder 102, and the degree of freedom in designing the manufactured showerhead 100 is increased.

Using the manufacturing method for the embodied showerhead, outer cylinder 102, being a metal pipe, is formed by bulge forming, therefore the entire body of a showerhead 100 with many curved surfaces can be easily formed of metal.

We have described embodiment of the present invention above. However the present invention is not limited to the these descriptions.

For example, we discussed the example of SUS304 as metal plate for forming the outer cylinder, but other metal materials may be used as appropriate so long as they have a favorable appearance and are durable relative to water.

With respect to the structure for affixing the water conduit member and spray member to the outer cylinder, our explanation was based on the third embodiment and the fourth embodiment variant thereon, but it is also possible, for example, by crimping the front end portion of the outer cylinder with the water conduit member or spray member inserted in the outer cylinder, to adopt a structure in which the water conduit member or spray member is affixed so as not to move relative to the outer cylinder.

Each of the elements comprising each of the above-described embodiments can be combined to the extent technically feasible; these combinations are also included in the scope of the present invention so long as they include the features of the present invention.

EXPLANATION OF REFERENCE NUMERALS

1: shower hose
2: socket
3: showerhead
31: outer cylinder
31a: opening portion
311: gripping portion
32: water conduit member
32a: water intake port
32b: water discharge port 33: spray member (spray portion)
33a: guide port
33b: spray holes
341: air layer (heat insulating means)
342: heat insulation (heat insulating means)
4: showerhead
41: outer cylinder
41a: spray holes
41b: spray portion
411: gripping portion
42: water conduit member
42a: water intake port
42b: water discharge port
43: packing
51: water conduit member
52: direction regulating portion (spray direction regulating means)
52a: opening portion
61: spray plate (spray direction regulating means)
61a: water passage holes
7: showerhead
71: outer cylinder
71a, 71b: opening portions
711: gripping portion
72: water conduit member
72a: water input port
72b: water discharge port
72c: flange
73: spray member
73b: spray holes
74: joining hardware
75: affixing base
76: joining hardware
8: showerhead
81: outer cylinder
81a, 81b: opening portion
82: water conduit member
82a, 82b: water intake ports
83: spray member
83b: spray holes
84: joining hardware
9: showerhead
91: outer cylinder
91a: spray holes
91b: spray portion
911: gripping portion
92: water conduit member
92a: water intake port
92b: water discharge port
93: packing
94: affixing base
95: joining hardware
100: showerhead
102: outer cylinder
102a: base end portion
102b: front end opening portion
102c: spray holes
102d: metal member
104: spray portion
106: gripping portion
108: connecting pipe
108a: flange portion
108b: male screw portion
108c: water conduit connecting portion
108d: channel
110: water conduit
110a: base end portion
110b: front end portion
112: spray chamber-forming member
112a: water conduit connecting portion
112b: spray chamber portion
112c: connecting portion
112d: channel
112e: round holes
114: hold-down cover
114a: sheet-shaped portion
114b: edging portion
114c: pins
114d: channel
116: spray plate (spray direction regulating means)
116a: spray nipples
116b: spray nozzle holes
118: spring member
118a: flat portion
118b: bent portion
118c: plate springs
120: packing

The invention claimed is:

1. A method for manufacturing a showerhead, comprising steps of: forming a metal plate into a cylindrical shape by plastic deformation of the metal plate;
joining butt surfaces of the metal plate, which has been formed into the cylindrical shape, by welding to form a metal pipe;
forming the metal pipe into a predetermined shape by plastic deformation of the metal pipe;
forming multiple spray holes in the metal pipe formed in the predetermined shape;
placing a water conduit member through an opening portion in the metal pipe into the metal pipe in which the spray holes are formed; and
closing the opening portion by laser welding of a metal member to the opening portion.

2. The method according to claim 1, wherein the step for forming the metal pipe includes steps of:
placing the metal pipe in a mold for bulge forming;
filling the interior of the metal pipe placed inside the mold with a filler; and
expanding the metal pipe by applying pressure to the filler to plastically deform the metal pipe into the shape of the mold.

* * * * *